(12) United States Patent
Kim et al.

(10) Patent No.: US 11,570,729 B2
(45) Date of Patent: Jan. 31, 2023

(54) METHOD AND DEVICE FOR CONTROLLING TRANSMISSION POWER OF TERMINAL IN BEAMFORMING SYSTEM

(71) Applicant: Samsung Electronics Co., Ltd., Suwon-si (KR)

(72) Inventors: Yongseok Kim, Incheon (KR); Hyunseok Ryu, Yongin-si (KR); Hyunkyu Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/496,386

(22) Filed: Oct. 7, 2021

(65) Prior Publication Data

US 2022/0030527 A1 Jan. 27, 2022

Related U.S. Application Data

(63) Continuation of application No. 16/621,024, filed as application No. PCT/KR2018/006588 on Jun. 11, 2018, now Pat. No. 11,147,029.

(30) Foreign Application Priority Data

Jun. 15, 2017 (KR) ........................ 10-2017-0076157
Sep. 11, 2017 (KR) ........................ 10-2017-0116098

(51) Int. Cl.
*H04W 52/42* (2009.01)
*H04L 5/00* (2006.01)
(Continued)

(52) U.S. Cl.
CPC ........... *H04W 52/42* (2013.01); *H04L 5/0007* (2013.01); *H04L 5/0051* (2013.01);
(Continued)

(58) Field of Classification Search
None
See application file for complete search history.

(56) References Cited

U.S. PATENT DOCUMENTS 9,497,711 B2 11/2016 Takeda et al.
2013/0078913 A1 3/2013 Lee et al.
(Continued)

FOREIGN PATENT DOCUMENTS

CN 103718623 A 4/2014
CN 104518845 A 4/2015
(Continued)

OTHER PUBLICATIONS

Huawei et al, 'UL SRS design for beam management, CSI acquisition', R1-1706938, 3GPP TSG RAN WG1 Meeting #89, May 8, 2017, Hangzhou, China.
(Continued)

*Primary Examiner* — Otis L Thompson, Jr.
(74) *Attorney, Agent, or Firm* — Jefferson IP Law, LLP

(57) ABSTRACT

The present disclosure relates to a communication technique for convergence of a 5G communication system for supporting a higher data transmission rate beyond a 4G system with an IoT technology, and a system therefor. The present disclosure may be applied to an intelligent service (for example, smart home, smart building, smart city, smart car or connected car, health care, digital education, retail business, security and safety-related service, etc.) on the basis of a 5G communication technology and an IoT related technology. The present invention relates to a method for controlling power of a terminal in a beamforming system and, specifically, provides a method for supporting control of uplink power of a terminal according to a beam change.

20 Claims, 12 Drawing Sheets

(51) Int. Cl.
*H04L 25/02* (2006.01)
*H04W 52/14* (2009.01)
*H04W 52/24* (2009.01)

(52) U.S. Cl.
CPC ....... *H04L 25/0226* (2013.01); *H04W 52/146* (2013.01); *H04W 52/242* (2013.01)

(56) References Cited

U.S. PATENT DOCUMENTS

| | | | |
|---|---|---|---|
| 2013/0225186 A1 | 8/2013 | Sato et al. | |
| 2014/0016576 A1 | 1/2014 | Noh | |
| 2014/0071903 A1 | 3/2014 | Sorrentino et al. | |
| 2014/0169322 A1 | 6/2014 | Ouchi et al. | |
| 2015/0018030 A1 | 1/2015 | Park et al. | |
| 2015/0223213 A1 | 8/2015 | Moon et al. | |
| 2016/0204921 A1* | 7/2016 | Kim | H04B 7/0691 370/312 |
| 2016/0219534 A1 | 7/2016 | Hao et al. | |
| 2017/0264402 A1 | 9/2017 | Papasakellariou | |
| 2017/0265212 A1* | 9/2017 | Zhang | H04W 72/042 |
| 2017/0290041 A1 | 10/2017 | Rico Alvarino et al. | |
| 2017/0366377 A1 | 12/2017 | Papasakellariou | |
| 2018/0103433 A1* | 4/2018 | Li | H04W 52/42 |
| 2018/0132210 A1 | 5/2018 | Rico Alvarino et al. | |
| 2018/0279229 A1 | 9/2018 | Dinan et al. | |
| 2018/0310257 A1 | 10/2018 | Papasakellariou | |
| 2018/0343148 A1 | 11/2018 | Hosseini et al. | |
| 2018/0359711 A1* | 12/2018 | Akkarakaran | H04W 52/38 |
| 2019/0150181 A1 | 5/2019 | Kim et al. | |
| 2019/0268852 A1 | 8/2019 | Ryu et al. | |
| 2019/0364438 A1* | 11/2019 | Yang | H04L 27/2602 |
| 2020/0053654 A1 | 2/2020 | Zhang | |
| 2020/0137592 A1 | 4/2020 | Guo et al. | |
| 2020/0228377 A1 | 7/2020 | Papasakellariou | |

FOREIGN PATENT DOCUMENTS

| | | |
|---|---|---|
| KR | 10-2019-0067834 A | 6/2019 |
| WO | 2013/025014 A2 | 2/2013 |

OTHER PUBLICATIONS

Huawei et al, 'UL SRS design for CSI acquisition and beam management', R1-1704241, 3GPP TSG RAN WG1 Meeting #88bis, Mar. 25, 2017, Spokane, USA.

Lenovo et al, 'Discussion of SRS resource configuration', R1-1707764, 3GPP TSG RAN WG1 Meeting #89, May 6, 2017, Hangzhou, P.R. China.

CATT, 'Further discussion on SRS transmission', R1-1707490, 3GPP TSG RAN WG1 Meeting #89, May 6, 2017, Hangzhou, P.R. China.

European Search Report dated Jan. 14, 2021, issued in European Application No. 18817687.9-1220 / 3624505.

Chinese Office Action dated Oct. 24, 2022, issued in Chinese Application No. 201880037846.9.

* cited by examiner

METHOD AND DEVICE FOR CONTROLLING TRANSMISSION POWER OF TERMINAL IN BEAMFORMING SYSTEM

CROSS-REFERENCE TO RELATED APPLICATION(S)

This application is a continuation application of prior application Ser. No. 16/621,024, filed on Dec. 10, 2019, which has issued as U.S. Patent No. 11,147,029 on Oct. 12, 2021, and which is a U. S. National Stage application under 35 U.S.C. § 371 of an International application number PCT/KR2018/006588, filed on Jun. 11, 2018, which is based on and claims priority of a Korean patent application number 10-2017-0076157, filed on Jun. 15, 2017, in the Korean Intellectual Property Office, and of Korean patent application number 10-2017-0116098, filed on Sep. 11, 2017, in the Korean Intellectual Property Office, the disclosure of each of which is incorporated by reference herein in its entirety

TECHNICAL FIELD

The disclosure relates to a method for controlling the power of a terminal in a beamforming system and, more particularly, to a method and apparatus for supporting uplink power control of a terminal according to a beam change.

BACKGROUND ART

Since the commercial deployment of 4G communication systems, efforts have been made to develop improved 5G or pre-5G communication systems to meet the ever increasing demand for wireless data traffic. As such, 5G or pre-5G communication systems are also called "beyond 4G network" or "post LTE system."

To achieve higher data rates, 5G communication systems consider utilization of the mmWave band (e.g., 60 GHz band). To decrease the pathloss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems.

To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (COMP), reception interference cancellation, and the like.

In addition, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

Meanwhile, the Internet is evolving from a human centered network where humans create and consume information into the Internet of Things (IoT) where distributed elements or things process and exchange information. There has also emerged the Internet of Everything (IOE) technology that combines IoT technology with big data processing technology through connection with cloud servers. To realize IoT services, base technologies related to sensing, wired/wireless communication and network infrastructure, service interfacing, and security are needed, and technologies interconnecting things such as sensor networks, machine-to-machine (M2M) or machine type communication (MTC) are under development. In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and machine-to-machine or machine type communication are being realized by use of 5G communication technologies including beamforming, MIMO, and array antennas. Application of cloud RANs to big data processing described above may be an instance of convergence of 5G communication technology and IoT technology.

With the recent advances in Long Term Evolution (LTE) and LTE-Advanced systems, there is a need for a method and apparatus for supporting uplink power control of a terminal according to a beam change in a beamforming system.

DISCLOSURE OF INVENTION

Technical Problem

The disclosure is to provide a method and apparatus that enable a terminal and a base station to support uplink transmission power control according to a beam change in a beamforming system.

Solution to Problem

According to an embodiment of the disclosure, there is provided a method for a terminal. The method may include: receiving information about a resource of a sounding reference signal (SRS) from a base station; determining a beam to be used for SRS transmission based on the SRS resource information; determining a transmission power for SRS transmission; and transmitting the SRS at the determined transmission power over the determined beam.

In one embodiment of the disclosure, the transmission power may be determined in consideration of at least one of a pathloss associated with the determined beam, a compensation value for the difference between a transmission beam and an SRS reception beam of the base station, or a compensation value for the difference between a reception beam and an SRS transmission beam of the terminal.

In another embodiment of the disclosure, the pathloss may be calculated for each beam pair composed of an SRS transmission beam of the terminal and an SRS reception beam of the base station.

In another embodiment of the disclosure, the method may further include performing an uplink beam management procedure with the base station, and the SRS resource information may be associated with one of plural transmission beams configured in the terminal through the uplink beam management procedure.

According to an embodiment of the disclosure, there is provided a method for a base station. The method may include: transmitting information about a resource of a sounding reference signal (SRS) to a terminal; determining a beam to be used for SRS reception from the terminal; and receiving the SRS over the determined beam, wherein a beam to be used for SRS transmission may be selected by the terminal based on the SRS resource information, a transmission power for SRS transmission may be determined by the terminal, and the SRS may be transmitted at the determined transmission power over the selected beam.

According to an embodiment of the disclosure, there is provided a terminal. The terminal may include: a transceiver configured to transmit and receive a signal; and a controller configured to receive information about a resource of a sounding reference signal (SRS) from a base station, determine a beam to be used for SRS transmission based on the SRS resource information, determine a transmission power for SRS transmission, and transmit the SRS at the determined transmission power over the determined beam.

According to an embodiment of the disclosure, there is provided a base station. The base station may include: a transceiver configured to transmit and receive a signal; and a controller configured to transmit information about a resource of a sounding reference signal (SRS) to the terminal, determine a beam to be used for SRS reception from the terminal, and receive the SRS over the determined beam, wherein a beam to be used for SRS transmission may be selected by the terminal based on the SRS resource information, a transmission power for SRS transmission may be determined by the terminal, and the SRS may be transmitted at the determined transmission power over the selected beam.

Advantageous Effects of Invention

According to the power control method of the disclosure, it is possible to secure uplink performance of the terminal and to minimize power consumption of the terminal through power control according to a beam change in a system using beamforming. It is also possible to minimize interference to neighbor cells through power control.

MODE FOR THE INVENTION

Figure 1:
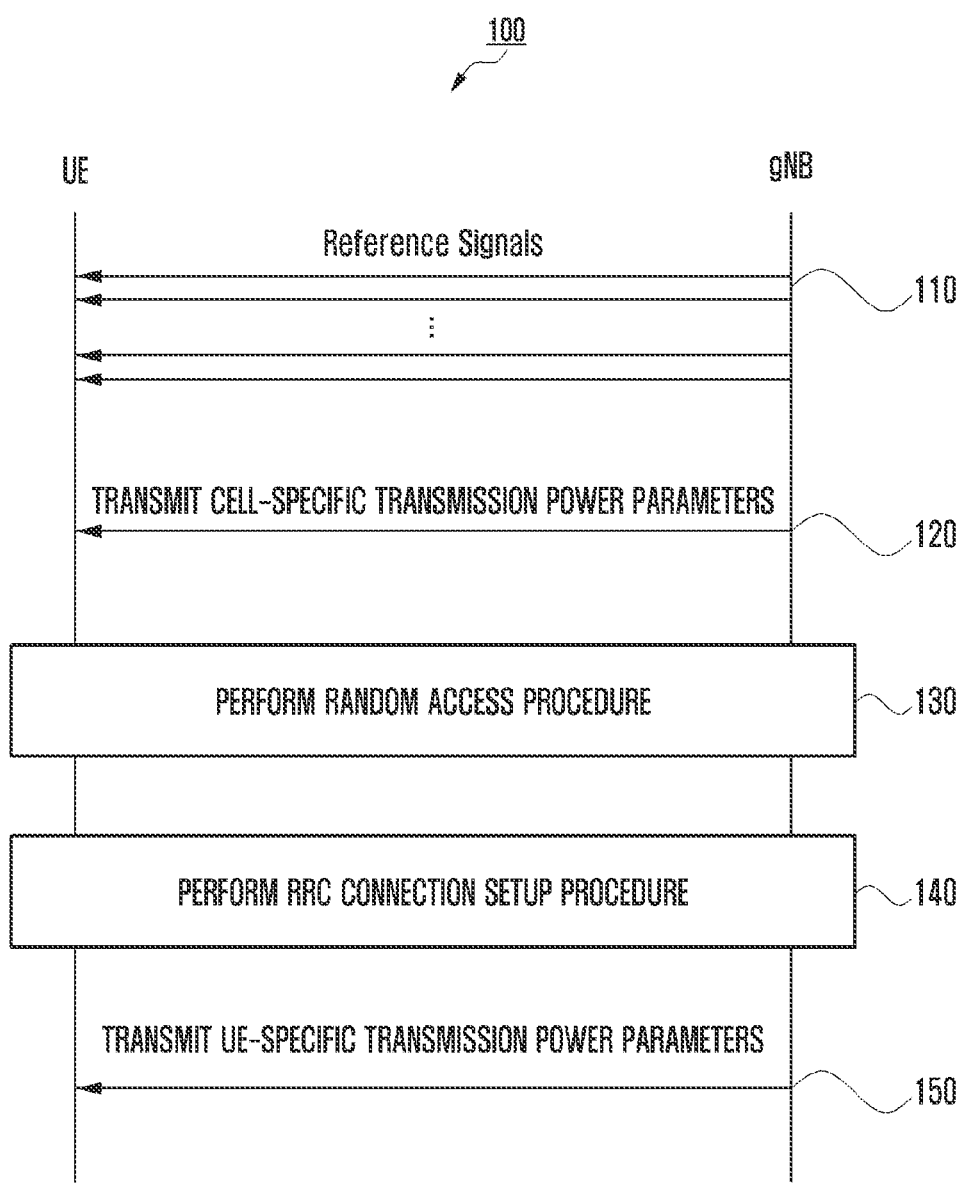
FIG. 1 shows an example of a parameter transmission procedure for controlling transmission power of a terminal.

Hereinafter, embodiments of the disclosure are described in detail with reference to the accompanying drawings. Descriptions of well-known functions and structures incorporated herein may be omitted to avoid obscuring the subject matter of the disclosure. The terms described below are defined in consideration of their functions in the disclosure, and these may vary depending on the intention of the user, the operator, or the custom. Hence, their meanings should be determined based on the overall contents of this specification.

The aspects, features, and advantages of certain embodiments of the disclosure will be more apparent from the following detailed description taken in conjunction with the accompanying drawings. The description of the various embodiments is to be construed as exemplary only and does not describe every possible instance of the disclosure. It should be apparent to those skilled in the art that the following description of various embodiments of the disclosure is provided for illustrative purposes only and not for the purpose of limiting the disclosure as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit," "module," or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose large components and units. Components and units may be configured to drive a device or one or more processors in a secure multimedia card.

In contrast to early wireless communication systems that provided voice-oriented services only, advanced broadband wireless communication systems, such as 3GPP high speed packet access (HSPA) systems, long term evolution (LTE) or evolved universal terrestrial radio access (E-UTRA) systems, LTE-advanced (LTE-A) systems, 3GPP2 high rate packet data (HRPD) systems, ultra mobile broadband (UMB) systems, and IEEE 802.16e based systems, may provide high-speed and high-quality packet data services. In addition, communication standards are being developed for 5G or NR (new radio) systems as the fifth generation wireless communication system.

Next, embodiments of the disclosure will be described in detail with reference to the accompanying drawings. In the following description, the term "base station" refers to a main agent allocating resources to terminals and may be at least one of eNode B, gNode B, Node B, BS, radio access unit, base station controller, or network node. The term "user equipment (UE)" may refer to at least one of terminal, mobile station (MS), cellular phone, smartphone, computer, or multimedia system with a communication function. The term "downlink (DL)" refers to a wireless transmission path through which the base station sends a signal to the terminal, and the term "uplink (UL)" refers to a wireless transmission path through which the terminal sends a signal to the base station. The following description of embodiments is focused on the LTE or LTE-A system. However, it should be understood by those skilled in the art that embodiments of the disclosure are applicable to other communication systems having similar technical backgrounds and channel configurations without significant modifications departing from the scope of the disclosure. For example, embodiments of the disclosure can be applied to the 5G mobile communication technology (5G, new radio, NR) developed after LTE-A.

The uplink transmission power of the terminal is controlled so as to minimize the amount of interference to neighbor cells and to minimize the power consumed by the terminal. In addition, the uplink transmission power is controlled to maintain the strength of a signal received by the base station at a constant level regardless of the position of the terminal in the serving cell, ensuring that the signal transmitted by the terminal is within the dynamic range of the automatic gain control (AGC) at the receiving end of the base station.

The disclosure proposes a method and apparatus that enable the base station and the terminal to control the transmission power of a sounding reference signal (SRS) in a system utilizing beamforming.

FIG. 1 illustrates a procedure 100 for the base station to transmit transmission power control parameters. Because the base station does not know the capability of a terminal until the capability negotiation with the terminal, it may transmit cell-specific transmission power parameters that can be used by all terminals connected to the cell regardless of their capabilities. For example, in the LTE system, the base station may transmit a parameter $P_{0\_PUSCH}$ to the terminal for transmission power control of the physical uplink shared channel (PUSCH), and the base station may transmit a parameter $P_{0\_PUCCH}$ to the terminal for transmission power control of the physical uplink control channel (PUCCH). Here, $P_{0\_PUSCH}$ is composed of $P_{0\_NOMINAL\_PUSCH}$ being a cell-specific parameter, and $P_{0\_UE\_PUSCH}$ being a UE-specific parameter. Similarly, $P_{0\_PUCCH}$ is composed of $P_{0\_NOMINAL\_PUCCH}$ being a cell-specific parameter, and $P_{0\_UE\_PUCCH}$ being a UE-specific parameter. The cell-specific parameters $P_{0\_NOMINAL\_PUSCH}$ and $P_{0\_NOMINAL\_PUCCH}$ may be transmitted to the terminal through a channel broadcast by the base station, such as master information block (MIB) or system information block (SEB). Before the terminal connects to the base station, UE-specific parameters $P_{0\_UE\_PUSCH}$ and $P_{0\_UE\_PUCCH}$ may be embedded as a single default value in the terminal and the base station. Here, the default value may be set to 0. The capability of a terminal may include information regarding measurement parameters of the terminal, handover, or beam-related characteristics of the terminal (reciprocity between the transmission beam and the reception beam, or whether the transmission beam can be selected based on the reception beam).

As another example, the base station may configure one or more cell-specific values through a broadcast channel such as MIB or SIB (120). Here, the cell-specific configuration value may activate the gain for each beam type used in each downlink signal, the difference between individual signals, the beam gain difference between the transmission beam and the reception beam, among various downlink signals transmitted by the base station. The signals transmitted by the base station in the downlink described above may be a primary synchronization signal (PSS), a secondary synchronization signal (SSS) (for downlink synchronization of the terminal), a cell-specific reference signal (CRS), or a demodulation reference signal (DMRS), or a combination thereof (110). The terminal may continue to use the aforementioned default values ($P_{0\_UE\_PUSCH}$ and $P_{0\_UE\_PUCCH}$) and the values activated by the base station (the gain for each beam type used in each downlink signal, the difference between individual signals, the beam gain difference between the transmission beam and the reception beam, among various downlink signals transmitted by the base station) until there is an additional command from the base station as shown in FIG. 1. Additional commands of the base station (update of $P_{0\_UE\_PUSCH}$ and $P_{0\_UE\_PUCCH}$) may be transmitted (150) through UE-specific RRC signaling or L1-signaling (i.e., via PDCCH) after radio resource control (RRC) connection setup (140) or performing the random access procedure (130).

Meanwhile, to reduce signaling overhead, single $P_{0\_PUSCH}$ and $P_{0\_PUCCH}$ values may be used without distinguishing between cell-specific and UE-specific parameters. These values may be transmitted to each terminal in a dedicated way via UE-specific RRC signaling or in a cell-specific way.

Meanwhile, in a beamforming system, the sounding reference signal (SRS) may be used for uplink beam management or may be used to obtain channel state information (CSI) for the uplink.

Figure 2:
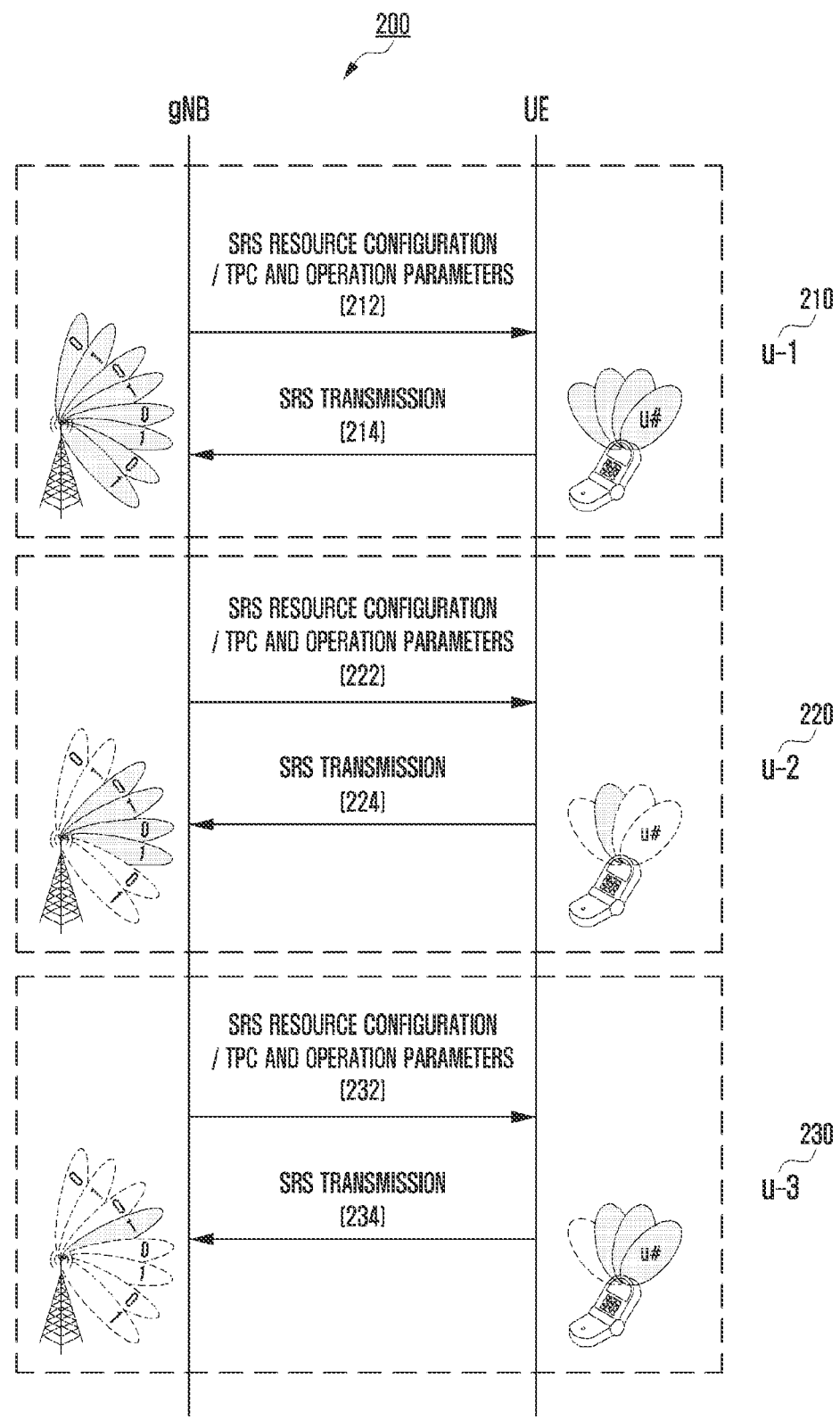
FIG. 2 shows an example of a procedure of transmitting a sounding reference signal (SRS) for uplink beam operation.

FIG. 2 shows an example of uplink beam management. Uplink beam management is a procedure for determining and operating one or more uplink transmission beams of the terminal and one or more reception beams of the base station, which are required to transmit data or control information in the uplink. Uplink beam management using the SRS may be performed in multiple stages (200) as shown in FIG. 2.

In the first stage (U-1, 210), plural reception beams of the base station and plural transmission beams of the terminal may be swept with each other. The terminal may simultaneously transmit and receive using a plurality of beams during SRS transmission, or may transmit and receive while sweeping one beam at a time. In the second stage (U-2, 220), the base station may sweep plural reception beams, but the terminal may use one transmission beam. Here, the base station may notify the terminal of the transmission beam to be used by the terminal through separate signaling. The number of reception beams used by the base station in stage U-2 (220) may be less than or equal to the number of reception beams used by the base station in stage U-1 (210). In the last stage (U-3, 230), the base station uses one reception beam, but the terminal may use plural transmission beams. Here, the number of transmission beams used by the terminal in stage U-3 (230) may be less than or equal to the number of transmission beams used by the terminal in stage U-1(210). In each of stages U-1, U-2 and U-3 (210, 220, 230) of FIG. 2, the base station may transmit information required for configuring SRS resources to the terminal, and may transmit transmission power control (TPC) information and parameters for controlling the SRS transmission operation (212, 222, 232). The terminal may transmit the SRS to the base station in consideration of at least one of the received SRS resource configuration information, TPC information, or operation parameters (214, 224, 234).

Figure 3:
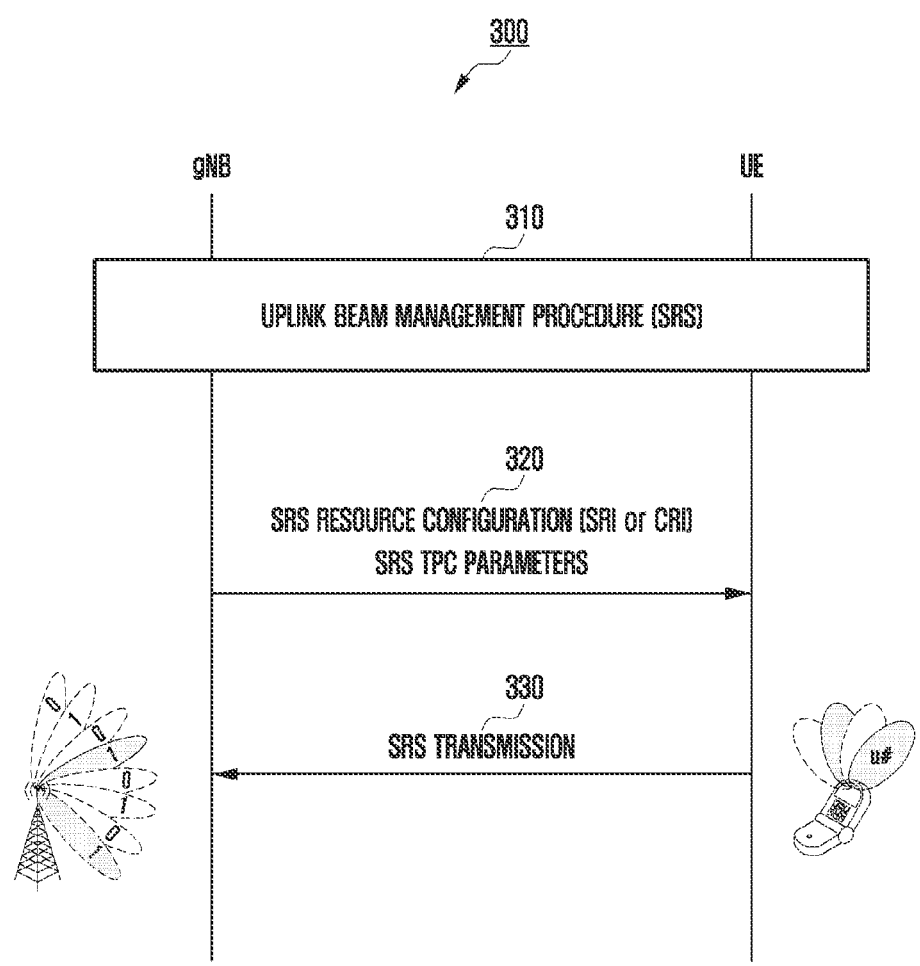
FIG. 3 shows an example of an SRS transmission procedure for obtaining uplink channel information.

FIG. 3 shows an example of an SRS operation method 300 for obtaining uplink channel information (CSI). The terminal and the base station may determine an uplink beam pair through the uplink beam management procedure 310 and transmit and receive data and control information through the corresponding beam pair. Here, the base station may obtain uplink CSI from the received SRS. After the beam management procedure between the base station and the terminal, the base station signals the SRS resource index and transmission power control parameters to the terminal while activating the SRS (320). The SRS resource index may be transmitted as a CSI-RS resource index (CRI) or an SRS resource index (SRI). The CRI is information that can be obtained after the downlink beam management procedure and may be used when the correlation between the downlink transmission beam and the uplink reception beam is high. The SRI is information that can be obtained after the uplink beam management procedure and can be used regardless of the correlation between the downlink transmission beam and the uplink reception beam. The terminal selects the SRS transmission beam by using the above information and transmits the SRS to the base station (330).

Figure 4:
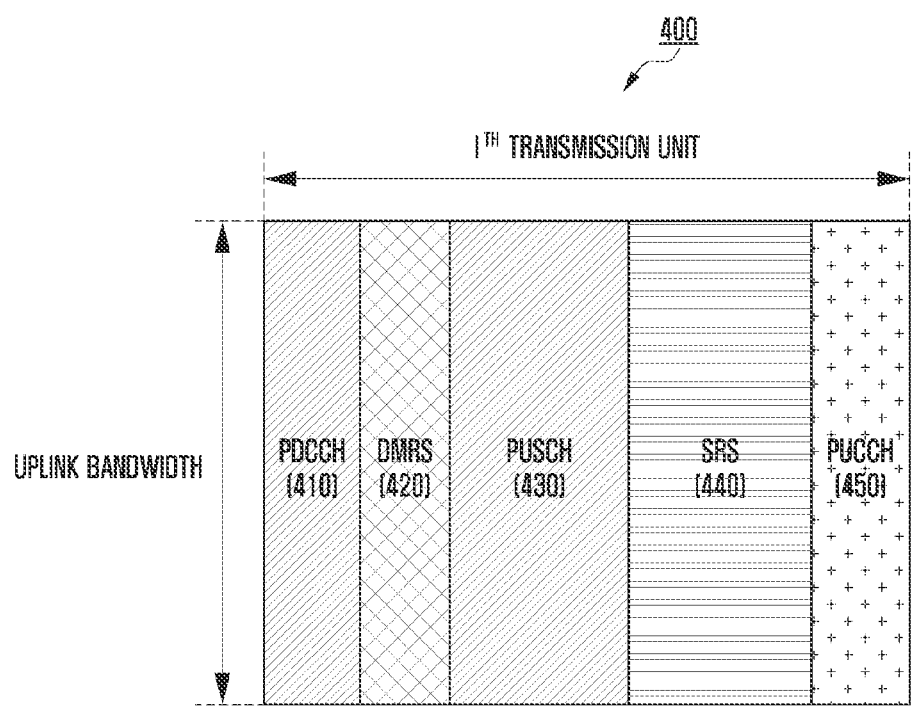
FIG. 4 shows an example of transmitting a reference signal (RS) for SRS transmission.

FIG. 4 shows an example of a frame structure 400 for SRS transmission. The terminal may transmit the SRS periodically or aperiodically. Upon receiving the SRS, the base station may obtain the uplink channel and timing information of the terminal. If there is a similarity between the downlink channel and the uplink channel in the TDD system, the base station may obtain information about the precoder for downlink transmission using the SRS reception channel. The SRS may be transmitted by being time division multiplexed (TDM) or frequency division multiplexed (FDM) with the uplink control channel or data channel. In FIG. 4, the SRS 440 is TDMed with the uplink data channel 430 for transmission. Although FIG. 4 illustrates an example of transmitting the SRS through the entire bandwidth of the uplink, the SRS may be transmitted through some of the uplink bandwidth (e.g., transmission within a bandwidth activated by the base station). One transmission unit may be composed of one slot or two or more slots. In addition to the uplink data channel 430 and the SRS 440 described above, the downlink control channel 410, DMRS 420, and uplink control channel 450 may exist in one transmission unit.

The transmission power of the SRS 440 may be determined by control parameters of the base station, the pathloss (PL) measured by the terminal, the beam used for SRS transmission, and the like. In particular, the SRS may be transmitted alternately or simultaneously by using one or plural terminal transmission beams and base station reception beams for a specific period of time. Hence, as various transmission power options are possible depending on the situation when transmitting the SRS, there is a need for a method for optimizing uplink transmission power for SRS transmission according to various situations to prevent unnecessary power consumption of the terminal and to minimize uplink interference. Next, the main points of the disclosure will be described with reference to specific embodiments.

Embodiment 1: Power Determination Method for SRS Transmission

Embodiment 1 Describes a Method for Determining SRS Transmission Power

SRS transmission power $P_{SRS,k}$ of the terminal may be determined according to Equation 1 below. The unit of the determined SRS transmission power is dBm. In Equation 1, k is a symbol index in the $i^{th}$ transmission unit (e.g., subframe including one slot or two or more slots).

$$P_{SRS,k}(i) = \min\left\{ \begin{array}{l} P_{CMAX}(i), \\ 10\log_{10}(M_{SRS}(i)) + P_{0,srs}(j) + \alpha_{SRS}(j) \cdot PL_{SRS,k}(t) + f_{SRS}(i) + \Delta_{RX,BS} + \Delta_{TX,UE} \end{array} \right\} [dBm] \quad \text{[Equation 1]}$$

Next, a description is given of each parameter in Equation 1.

1) $P_{CMAX}(i)$: the maximum transmission power available to the terminal in the $i^{th}$ transmission unit. This is determined by the power class of the terminal, parameters activated by the base station, and various parameters embedded in the terminal.

2) $M_{SRS}(i)$: the amount of resources used for SRS transmission in the $i^{th}$ transmission unit (e.g., the number of RBs used for SRS transmission on the frequency axis). This is determined by the base station via higher-layer signaling to the terminal.

3) $P_{0,SRS}(j)$: $P_{0,srs}(j)$ is composed of $P_{0\_srs\_Nominal}(j)$ and $P_{0,srs\_UE}(j)$. $P_{0,srs\_Nominal}(j)$ is a cell specific value and is transmitted via cell-specific RRC signaling, and $P_{0,srs\_UE}(j)$ is a terminal specific value and is transmitted via dedicated RRC signaling. Here, j indicates a grant scheme of the PUSCH. In LTE, j=0 indicates a semi-persistent grant, j=1 indicates a dynamically scheduled grant, j=2 indicates a random access response, and so on.

4) $\alpha(j)$: a value for compensating for the pathloss between the base station and the terminal. One of the values of $\{0, \ldots, 1\}$ is notified to the terminal through RRC signaling.

5) $f_{SRS}(i)$: SRS transmission power adjustment parameter. It is a closed loop parameter.

6) $\Delta_{RX,BS}$: in the case of a system considering analog beamforming, the transmission beam of the base station used for the downlink reference signal (e.g., synchronization signal, DMRS, or CSI-RS) may be different from the SRS reception beam of the base station. It is a parameter compensating for such as a beam difference, and may be transmitted through a signaling of the base station (e.g., downlink control information (DCI), medium access control (MAC) control element, or RRC).

7) $\Delta_{TX,UE}$: in the case of a system considering beams, the reception beam of the terminal used for the downlink reference signal (e.g., synchronization signal, DMRS, or CSI-RS) may be different from the SRS transmission beam of the terminal. It is a parameter compensating for such as a beam difference. This is a value stored by the terminal as a capability. This value may be transmitted when the terminal performs capability negotiation with the base station.

8) $PL_{SRS,k}(t)$: This is a pathloss between the base station and the terminal for calculating the transmission power, and is an index indicating the link performance between the base station and the terminal. In a system using analog beamforming, this may be represented as various values according to the beams or beam pairs used by the base station and the terminal.

Here, t is a parameter controlled by the base station through higher-layer signaling or a grant when the SRS is triggered, and is used for the following operations. t may be used in one of the following cases or in a combination thereof.

8-1) t=0: a case where the base station desires a similar or identical reception power of the base station for combinations of reception beams of the base station and transmission beams of the terminal.

To maintain the reception power of the base station at a similar or the same level, it is necessary to apply a different pathloss value for each of the reception beam of the base station and the transmission beam of the terminal used at symbol k. That is, when transmission beam l of the terminal and reception beam m of the base station are used at symbol k, the pathloss value for transmission power calculation is set by $PL_{srs,k}(t)=\min\{\widehat{PL_{SRS,l,m}}(t), PL_{th}(t)\}$ Here, $\widehat{PL_{SRS,l,m}}(t)$ is an actual pathloss value measured by the terminal, and the pathloss reference value $PL_{th}(t)$ may be differently defined such as L3filteredPL,min $\widehat{PL}$ +[x]dB, max $\widehat{PL}$ −[x]db. Among the various definitions, the base station may notify the terminal of the definition to be used through signaling. By applying $PL_{th}(t)$, it is possible to prevent unnecessary power consumption and to reduce the interference in the beamforming system.

8-2) t=1: a case where the base station desires a similar or identical transmission power of the terminal for combinations of reception beams of the base station and transmission beams of the terminal.

If all symbols use the same transmission power during SRS transmission, the same $PL_{SRS,k}(t)$ should be applied regardless of transmission beam l of the terminal and reception beam m of the base station allocated at symbol k. Here, the reference pathloss PL may be determined in various ways as follows. The method for determining the reference pathloss may be signaled by the base station, or the terminal may report to the base station about a pathloss determination method to be used by the terminal. Alternatively, a pathloss determination method agreed in advance between the base station and the terminal may be applied. Thereby, when plural SRSs are transmitted, a problem that may occur due to a change in the SRS transmission power for individual symbols may be prevented, and the terminal can be easily implemented. For example, if the difference in the SRS transmission power is large between individual symbols, the time required for the terminal to set the transmission power may become long. Thus, to meet the requirement of transmitting the SRS in consecutive symbols, an additional mechanism or method may be needed.

When the transmission beam set of the terminal and the reception beam set of the base station available in the SRS operation are given by (L, M), the transmission power at symbol k may be operated in various manners as shown in Equation 2 below. In the following equation, $w_{l,m}$ is a weight for transmission beam l and reception beam m of the base station.

$$\text{①}PL_{SRS,k}(t)=W_{0,0}\cdot\widehat{PL_{SRS,0,0}}(t)+W_{0,1}\cdot\widehat{PL_{SRS,0,1}}(t)+$$
$$W_{0,2}\cdot\widehat{PL_{SRS,0,2}}(t)+\ldots+W_{L-1,M-1}\cdot PL$$
$$SRS,L-1,M-1\ (t)+\Delta PL\ \text{②}PL_{SRS,k}(t)=\min\{P$$
$$\widehat{L_{SRS,0,0}}(t),P\ \widehat{L_{SRS,0,1}}(t),P\ \widehat{L_{SRS,0,2}}(t),\ldots$$
$$,PL\ SRS,L-1,M-1\ (t)\}+\Delta PL\ \text{③}PL_{SRS,k}(t)=\max\{P$$
$$\widehat{L_{SRS,0,0}}(t),P\widehat{L_{SRS,0,1}}(t),P(\widehat{L_{SRS,0,2}}(t),\ldots,PL$$
$$SRS,L-1,M-1\ (t)\}+\Delta PL\ \text{④}PL_{SRS,k}(t)=L3\text{filtered}PL+$$
$$\Delta PL\ \text{⑤}PL_{SRS,k}(t)=PL\ \text{from high layer message}+$$
$$\Delta PL \qquad\qquad\text{[Equation 2]}$$

Here, $\Delta PL$ is a value signaled by the base station to the terminal, and is a parameter usable for correcting the pathloss when the terminal does not know the reception beam of the base station.

When transmitting the SRS with the same transmission power as in this embodiment, to control interference to neighbor base stations, the transmission power may be limited if the pathloss measured by the terminal is large. A method for limiting the transmission power may be performed according to Equation 3 below, and other options may be applicable.

$$\text{①}PL_{SRS,k}(t)=\alpha\cdot PL_{SRS,k}(t)\ \text{if}\ P$$
$$\widehat{L_{SRS,l,m}}(t)<PL_{th}(t)\text{②}PL_{SRS,k}(t)=x\ \text{if}\ P$$
$$\widehat{L_{SRS,l,m}}(t)<PL_{th}(t) \qquad\qquad\text{[Equation 3]}$$

In Equation 3, $\alpha$ or x is a value determined by the base station, which is transmitted via higher-layer signaling or is embedded in the terminal.

The above method may be used for a case where the base station does not transmit the reference beam information to the terminal or the terminal does not know about the reference beam pair link (BPL). In this case, the power control parameters for the SRS may be directly transmitted by the base station, or the terminal may apply the existing PUSCH information. Alternatively, the terminal may select and apply a specific parameter among multiple power control parameters. Here, the power control parameters may include $\alpha(j)$ for compensating for the pathloss between the base station and the terminal, and $P_0(j)$ for obtaining a preset level of received power at the base station.

On the other hand, when the base station transmits reference beam or reference information for determining the SRS of the terminal, the terminal may determine the transmission power for SRS transmission as follows.

When the terminal transmits the SRS using plural beams, to transmit with the same transmission power for the plural beams, the base station may signal reference information for calculating the transmission power. That is, the terminal may select a beam signaled by the base station from among the plural beams used for SRS transmission, and calculate the transmission power by using the power control parameter of the selected beam or using the power control parameter directly transmitted by the base station. Here, the power control parameters may include $\alpha(j)$ for compensating for the pathloss between the base station and the terminal, and $P_0(j)$ for obtaining a preset level of received power at the base station.

When the base station transmits information about the reference beam to be used by the terminal, the base station may directly indicate the beam information, or may transmit the beam information as a portion of the related information such as CRI or SRI.

Here, the CRI (CSI-RS resource index) is information that can be obtained after the downlink beam management procedure and may be mainly used when the correlation between the downlink transmission beam and the uplink reception beam is high. The SRI (SRS resource index) is information that can be obtained after the uplink beam management procedure and can be used when the correlation between the downlink transmission beam and the uplink reception beam is low. The terminal may select the reference beam for SRS transmission by using the above information.

The terminal calculates the transmission power by using the above information according to Equation 4 below.

$$P_{SRS}(i) = \min\begin{Bmatrix} P_{Cmax}(i) \\ 10\log_{10}(M_{SRS}(i)) + P_0(j) + \alpha(j)\cdot PL + f_{SRS}(i) + \text{delta} \end{Bmatrix} [dBm] \quad \text{[Equation 4]}$$

To calculate the above power, when using one or plural combinations of parameters $\alpha(j)$ and $P_0(j)$ for PUSCH transmission (or SRS), the base station may indicate and signal $\alpha(j)$ and $P_0(j)$ to be used among the combinations as a reference value for SRS transmission. As one option, the base station may select a reference beam through beam indication, CRI and SRI, and select $\alpha(j)$ and $P_0(j)$ values for the reference beam. Alternatively, the base station may be allowed to select one from the combinations through a separate signaling. As another option, separate $\alpha(j)$ and $P_0(j)$ values may be signaled for the SRS.

$M_{SRS}(i)$ is the amount of resources used for SRS transmission in the $i^{th}$ transmission unit (e.g., the number of RBs used for SRS transmission on the frequency axis). This is determined by the base station via higher-layer signaling to the terminal. $f_{SRS}(i)$ is an SRS transmission power adjustment parameter and is a closed loop parameter. This applies the value for the PUSCH used for the reference beam. Or, it is used after being updated by the value transmitted by the base station through SRS TPC. For example, it is applied in the form of $f_{SRS}(i)=f_{SRS}(i-1)+\delta_{SRS}(i-K_{srs})$ if cumulative, and is applied in the form of $f_{SRS}(i)=\delta_{srs}(i-K_{srs})$ if not cumulative. Here, $\delta_{srs}(i-K_{srs})$ is a correction value transmitted in the $i-K_{srs}^{th}$ unit via the PDCCH. In addition, delta is a value for the base station to compensate the power when the terminal transmits the SRS and is signaled by the base station to the terminal.

To calculate the above power, the reference beam may be selected through beam indication, CRI, or SRI and the reference pathloss value may be selected as the corresponding pathloss value. Here, when the terminal can explicitly know the combination of the base station reception beam and the terminal transmission beam (BPL), it reflects the pathloss of the beam combination (BPL). However, if the beam combination between the base station and the terminal is not known exactly, the terminal may reflect the pathloss in the following manner.

1) When the transmission beam $\bar{l}$ of the terminal is known and the reception beam of the base station is unknown, the reference pathloss value is determined by the following calculation. That is, a reference pathloss value is calculated for plural reception beams with respect to the transmission beam of the terminal. The pathloss calculation method may be specified as a standard among various methods including the method of Equation 5 below, or the base station may signal to select one of various calculation methods including the following method.

① $PL = w_{L,0}\cdot PL_{SRS,\bar{l},0} + w_{L,1}\cdot PL_{SRS,\bar{l},1} + w_{L,2}\cdot PL_{SRS,\bar{l},2} + \ldots + w_{L,M-1}\cdot PL_{SRS,\bar{l},M-1}$ [Equation 5]

Here, $w_{l,m}$ are weighted values for a terminal transmission beam l and a base station reception beam m.

② $PL = \min\{PL_{SRS,\bar{l},0}, PL_{SRS,\bar{l},1}, PL_{SRS,\bar{l},2}, \ldots, PL_{SRS,\bar{l},M-1}\}$ ③ $PL = \max\{PL_{SRS,\bar{l},0}, PL_{SRS,\bar{l},1}, PL_{SRS,\bar{l},2}, \ldots, PL_{SRS,\bar{l},M-1}\}$ ④ $PL = L3\text{filtered}PL$ ⑤ $PL = PL$ from high layer message In the above method, $\Delta PL$ may be signaled to compensate for an error in the pathloss at the base station as shown in Equation 6 below.

① $PL = w_{L,0}\cdot PL_{SRS,\bar{l},0} + w_{l,1}\cdot PL_{SRS,\bar{l},1} + w_{l,2}\cdot PL_{SRS,\bar{l},2} + \ldots + w_{l,m-1}\cdot PL_{SRS,\bar{l},M-1} + \Delta PL$ [Equation 6]

Here, $w_{l,m}$ are weighted values for a terminal transmission beam l and a ... [Equation 6] base station reception beam m.

② $PL = \min\{PL_{SRS,\bar{l},0}, PL_{SRS,\bar{l},1}, PL_{SRS,\bar{l},2}, \ldots, PL_{SRS,\bar{l},M-1}\} + \Delta PL$ ③ $PL = \max\{PL_{SRS,l,0}, PL_{SRS,l,1}, PL_{SRS,l,2}, \ldots, PL_{SRS,l,M-1}\} \Delta PL$ ④ $PL = L$ filtered $PL + \Delta PL$ ⑤ $PL = PL$ from high layer message$\Delta PL$ 2) When the reception beam $\bar{m}$ of the base station is known and the transmission beam of the terminal is unknown, the reference pathloss value is determined by the following calculation. That is, the reference pathloss value is calculated for plural transmission beams with respect to the reception beam of the base station. The pathloss calculation method may be specified as a standard among various methods including the method of Equation 7 below, or the base station may signal to select one of various calculation methods including the following method.

① $PL = w_{0,m}\cdot PL_{SRS,0,\bar{m}} + w_{1,m}\cdot PL_{SRS,1,\bar{m}} + w_{2,m}\cdot PL_{SRS,2,\bar{m}} + \ldots + w_{L-1,m}\cdot PL_{SRS,L-1,\bar{m}}$ [Equation 7]

Here, $w_{l,m}$ are weighted values for a terminal transmission beam l and a base station reception beam m.

②$PL=\min\{PL_{\overline{SRS},0,m}, PL_{\overline{SRS},1,m}, PL_{\overline{SRS},2,m}, \ldots, PL_{\overline{SRS},L-1,m}\}$ ③$PL=\max\{PL_{\overline{SRS},0,m}, PL_{\overline{SRS},1,m}, PL_{\overline{SRS},2,m}, \ldots, PL_{\overline{SRS},L-1,m}\}$ ④$PL=L3\text{filtered}PL$ ⑤$PL=PL$ from high layer message In the above method, ΔPL may be signaled to compensate for an error in the pathloss at the base station as shown in Equation 8 below.

①$PL = w_{0,m} \cdot PL_{\overline{SRS},0,m} + w_{1,m} \cdot PL_{\overline{SRS},1,m} + w_{2,m} \cdot PL_{\overline{SRS},2,m} + \ldots + W_{L-1,m} \cdot PL_{\overline{SRS},L-1,m} + \Delta PL$ ②$PL = \min\{PL_{\overline{SRS},0,m}, PL_{\overline{SRS},1,m}, PL_{\overline{SRS},2,m}, \ldots, PL_{\overline{SRS},L-1,m}\} + \Delta PL$ ③$PL = \max\{PL_{\overline{SRS},0,m}, PL_{\overline{SRS},1,m}, PL_{\overline{SRS},2,m}, \ldots, PL_{\overline{SRS},L-1,m}\} + \Delta PL$ ④$PL = L3\text{filtered}PL + \Delta PL$ ⑤$PL = PL$ from high layer message+ΔPL [Equation 8]

8-3) Various other SRS power operation methods are possible.
① t=2: a case where the base station desires a similar or identical transmission power for reception beams of the base station
② t=3: a case where the base station desires a similar or identical reception power for reception beams of the base station
③ t=4: a case where the base station desires a similar or identical transmission power for transmission beams of the terminal
④ t=5: a case where the base station desires a similar or identical reception power for transmission beams of the terminal Embodiment 2: SRS transmission power determination when the terminal knows the reception beam of the base station.

Figure 5:
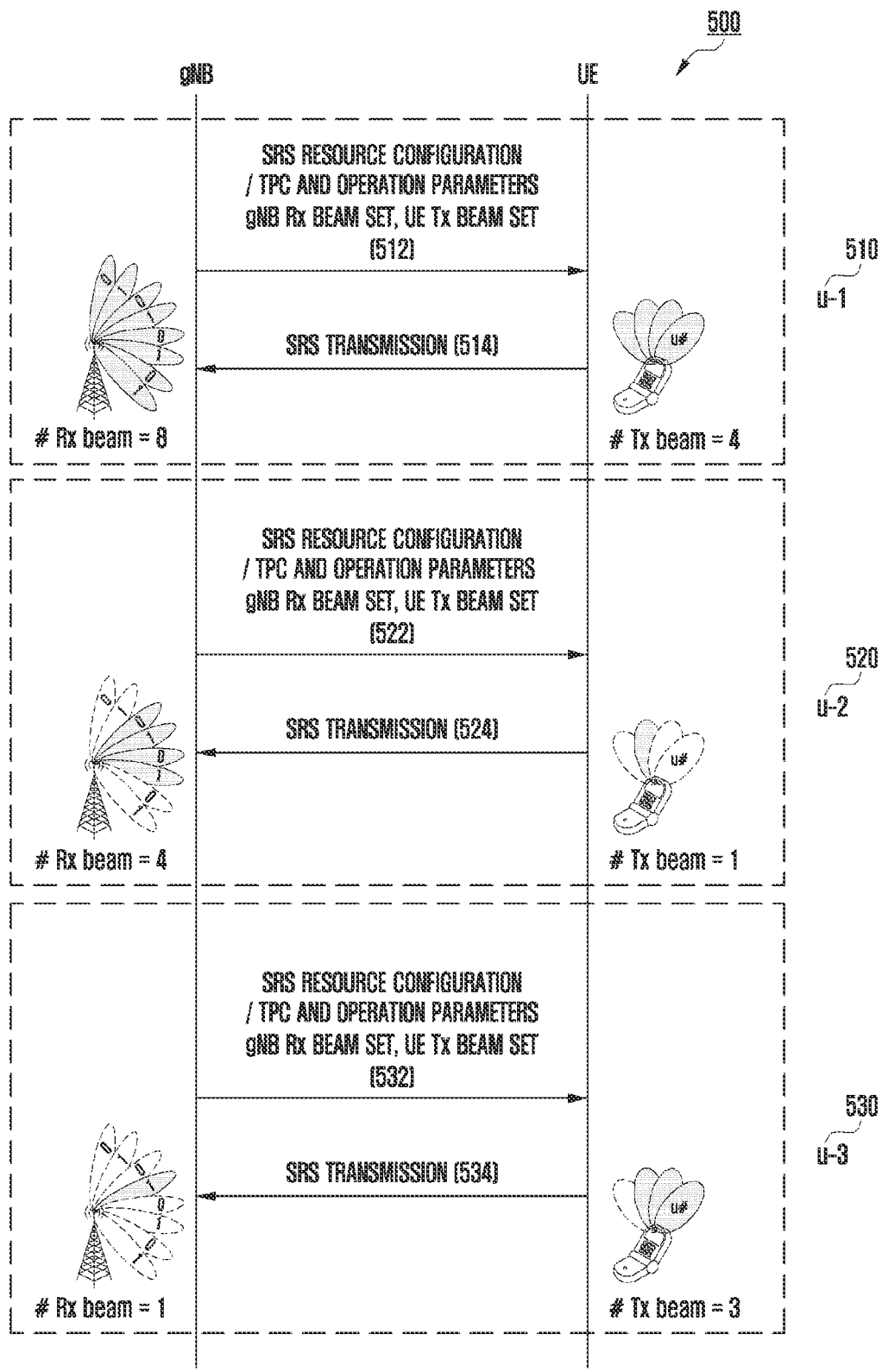
FIG. 5 illustrates a case where the terminal can know the reception beam of the base station during SRS transmission.

This embodiment is applicable when the base station transmits the reception beam information to the terminal during uplink beam operation and the terminal can know the reception beam of the base station. FIG. 5 illustrates a case 500 where the terminal can know the reception beam of the base station during SRS transmission. With reference to FIG. 5, in stage U-1 (510), the base station signals information about 8 reception beam indexes={0, 1, 2, 3, ..., 6,7} and 4 transmission beam indexes of the terminal={0, 1, 2, 3} to the terminal (512).

The base station also transmits information necessary for calculating the SRS transmission power (request for the same transmission power, application of the minimum reference pathloss among all transmission and reception beams, and ΔPL=0). In stage U-1 (510), the SRS transmission power at symbol k may be determined by the terminal according to Equation 9 below. The terminal may transmit the SRS by using the determined transmission power (514).

$$P_{SRS,k}(i) = \min\left\{ \begin{array}{l} P_{CMAX}(i), \\ 10\log_{10}(M_{SRS}(i)) + P_{0,srs}(j) + \alpha_{SRS}(j) \cdot PL_{SRS,k}(t) + f_{SRS}(i) + \Delta_{RX,BS} + \Delta_{TX,UE} \end{array} \right\} [dBm] \text{ Here,}$$

$$PL_{SRS,k}(t) = \min\{\widetilde{PL_{SRS,0,0}}(t), \widetilde{PL_{SRS,0,1}}(t), \widetilde{PL_{SRS,0,2}}(t), \ldots, \widetilde{PL_{SRS,3,7}}(t)\} + 0,$$

for $l = \{0, 1, 2, 3\}, m = \{0, 1, 2, 3, \ldots, 6, 7\}$

[Equation 9]

In stage U-2 (520), the base station signals information about four reception beam indexes={2, 3, 4, 5} and one transmission beam index={1} of the terminal to the terminal (522). The base station also transmits information necessary for calculating the SRS transmission power (request for the same transmission power, application of the minimum reference pathloss among all transmission and reception beams, and ΔPL=0). In stage U-2 (520), the SRS transmission power may be determined by the terminal according to Equation 10 below. The terminal may transmit the SRS by using the determined transmission power (524).

$$P_{SRS,k}(i) = \min\left\{ \begin{array}{l} P_{CMAX}(i), \\ 10\log_{10}(M_{SRS}(i)) + P_{0,srs}(j) + \alpha_{SRS}(j) \cdot PL_{SRS,k}(t) + f_{SRS}(i) + \Delta_{RX,BS} + \Delta_{TX,UE} \end{array} \right\} [dBM] \text{ Here,}$$

$$PL_{SRS,k}(t) = \min\{\widetilde{PL_{SRS,1,2}}(t), \widetilde{PL_{SRS,1,3}}(t), \widetilde{PL_{SRS,1,4}}(t), \widetilde{PL_{SRS,1,5}}(t)\} + 0,$$

for $l = \{1\}, m = \{2, 3, 4, 5\}$

[Equation 10]

The terminal calculates the transmission power using the reference pathloss value changed due to a set of transmission and reception beams different from that of stage U-1 (510).

In stage U-3 (530), the base station signals information about one reception beam index={3} and three transmission beam indexes={1, 2, 3} of the terminal to the terminal (532). The base station also transmits information necessary for calculating the SRS transmission power (request for the similar transmission power, and ΔPL=0). In stage U-3 (530), the SRS transmission power may be determined by the terminal according to Equation 11 below. The terminal may transmit the SRS by using the determined transmission power (534).

$$P_{SRS,k}(i) = \min\left\{ \begin{array}{l} P_{CMAX}(i), \\ 10\log_{10}(M_{SRS}(i)) + P_{0,srs}(j) + \alpha_{SRS}(j) \cdot PL_{SRS,k}(t) + f_{SRS}(i) + \Delta_{RX,BS} + \Delta_{TX,UE} \end{array} \right\} [dBm] \text{ Here,}$$

[Equation 11]

-continued $$PL_{SRS,k}(t) = PL_{\widehat{SRS},l,m}(t) + 0, \text{ for } l = \{1, 2, 3\}, m = \{3\}$$

The terminal calculates the transmission power by reflecting a pathloss value for each transmission and reception beam owing to the transmission and reception beam set different from that of stage U-1 (510) and a changed transmission power calculation scheme.

Embodiment 3: SRS transmission power determination when the terminal does not have information about the reception beam of the base station.

Figure 6:
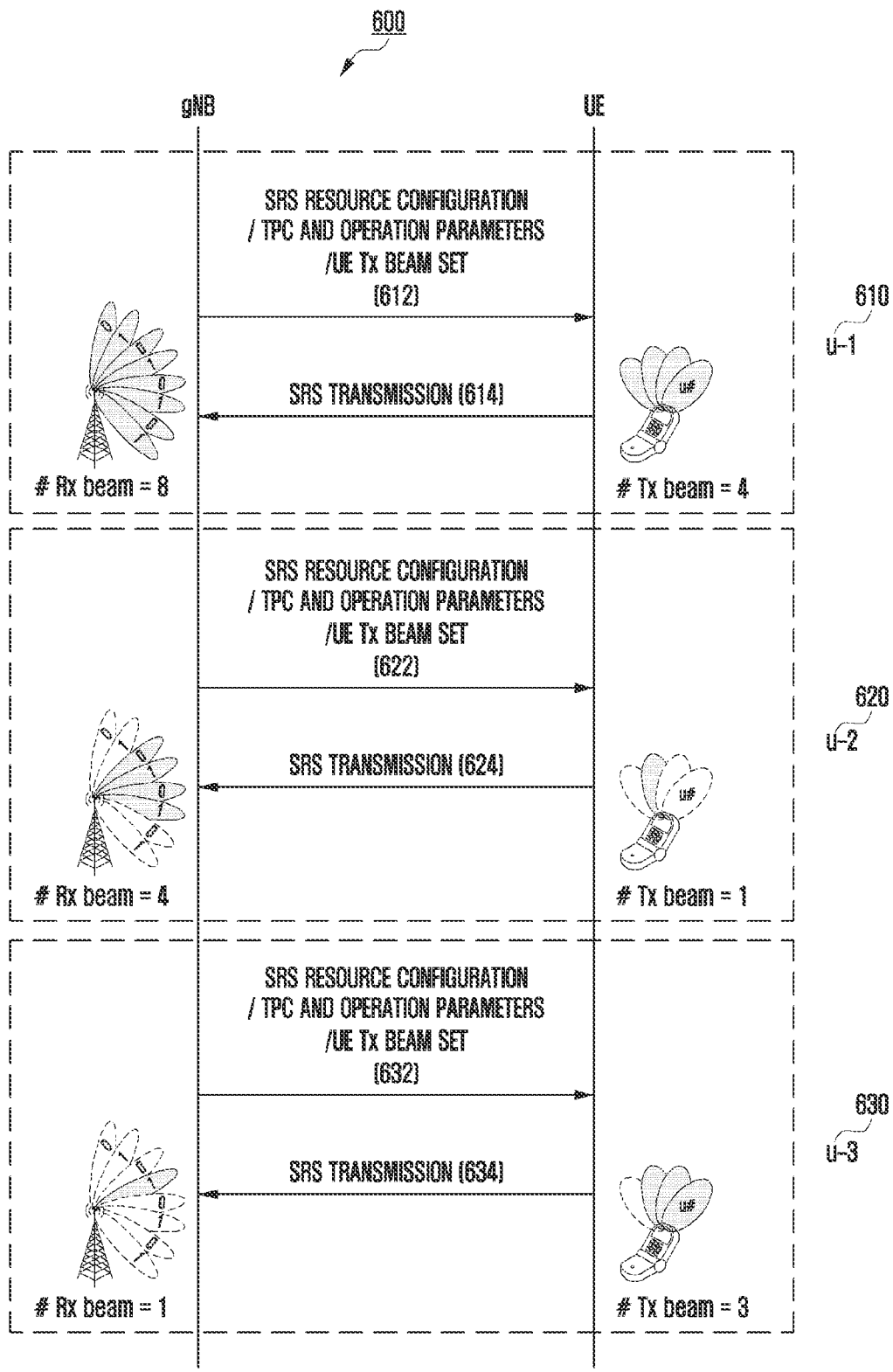
FIG. 6 illustrates a case where the terminal cannot know the reception beam of the base station during SRS transmission.

This embodiment is applicable when the terminal does not know the reception beam of the base station operating uplink beams. FIG. 6 illustrates a case 600 where the terminal cannot know the reception beam of the base station during SRS transmission. With reference to FIG. 6, in stage U-1 (610), the base station signals information about 4 transmission beam indexes of the terminal={0, 1, 2, 3} to the terminal (612). The base station also transmits information required for SRS transmission power calculation (request for the same transmission power, L3 filtered PL for the pathloss, ΔPL=3 dB). The SRS transmission power may be determined according to Equation 12 below in stage U-1 (610). The terminal may transmit the SRS by using the determined transmission power (614).

$$P_{SRS,k}(i) = \min\left\{\begin{array}{l} P_{CMAX}(i), \\ 10\log_{10}(M_{SRS}(i)) + P_{0,srs}(j) + \alpha_{SRS}(j) \cdot PL_{SRS,k}(t) + f_{SRS}(i) + \Delta_{RX,BS} + \Delta_{TX,UE} \end{array}\right\}[dBm] \text{ Here,}$$

[Equation 12]

$$PL_{SRS,k}(t) = L3 \text{ filtered } PL + 3, \text{ for } l = \{1, 2, 3\}, m = \{3\}$$

In addition, even if the terminal does not obtain information on the transmission beam of the terminal from the base station in stage U-1 (610), the terminal may calculate the transmission power according to Equation 12.

In stage U-2 (620), the base station signals information about one transmission beam index=1 of the terminal to the terminal (622). The base station also transmits information necessary for calculating the SRS transmission power (request for the same transmission power, application of the minimum pathloss among all transmission and reception beams, and ΔPL=6). In stage U-2 (620), the terminal may determine the SRS transmission power according to Equation 13 below, and the terminal may transmit the SRS by using the determined transmission power (624).

$$P_{SRS,k}(i) = \min\left\{\begin{array}{l} P_{CMAX}(i), \\ 10\log_{10}(M_{SRS}(i)) + P_{0,srs}(j) + \alpha_{SRS}(j) \cdot PL_{SRS,k}(t) + f_{SRS}(i) + \Delta_{RX,BS} + \Delta_{TX,UE} \end{array}\right\}[dBm]$$

[Equation 13]

$$PL_{SRS,k}(t) = L3 \text{ filtered } PL + 6, \text{ for all } k$$

In stage U-3 (630), the base station signals information about 3 transmission beam indexes={1,2,3} of the terminal to the terminal (632). The base station also transmits information necessary for calculating the SRS transmission power (request for the same transmission power, application of the minimum pathloss among all transmission and reception beams, and ΔPL=4). In stage U-3 (630), the terminal may determine the SRS transmission power according to Equation 14 below, and the terminal may transmit the SRS by using the determined transmission power (634).

$$P_{SRS,k}(i) = \min\left\{\begin{array}{l} P_{CMAX}(i), \\ 10\log_{10}(M_{SRS}(i)) + P_{0,srs}(j) + \alpha_{SRS}(j) \cdot PL_{SRS,k}(t) + f_{SRS}(i) + \Delta_{RX,BS} + \Delta_{TX,UE} \end{array}\right\}[dBm]$$

[Equation 14]

$$PL_{SRS,k}(t) = L3 \text{ filtered } PL + 4, \text{ for all } k$$

Figure 8:
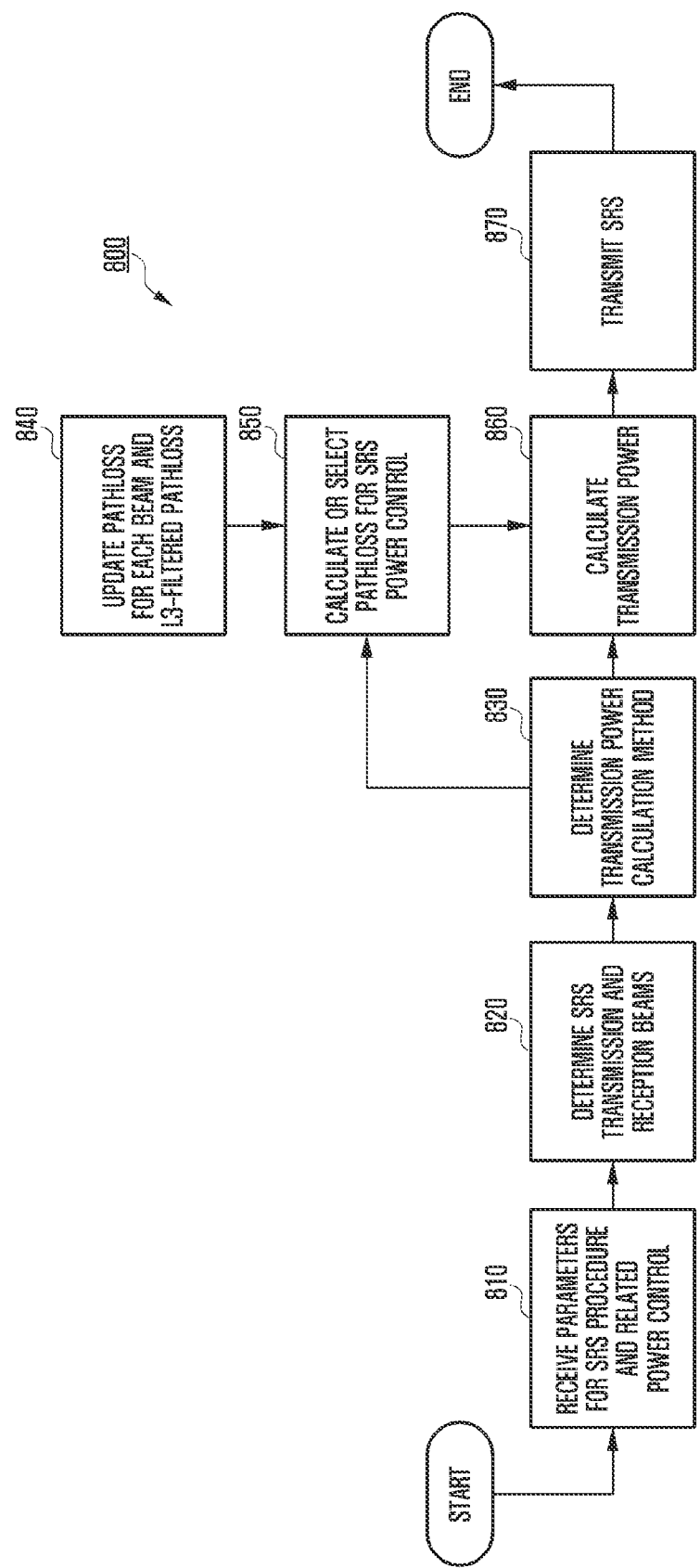
FIG. 8 illustrates a procedure for the terminal to determine the SRS transmission power.

Meanwhile, detailed operations for determining the SRS transmission power by the terminal in each stage described above are shown in FIG. 8. The terminal receives parameters for the SRS procedure and the transmission power from the base station (810), determines the SRS transmission and reception beams (820), and determines the transmission power calculation method (830). The terminal updates the pathloss for each beam according to the power calculation method (840), calculates or selects the pathloss for SRS transmission power control (850), calculates the SRS transmission power by using the above equations for each transmission and reception beam (alternatively, beam pair, beam group, or beam-pair group) (860), and transmits the SRS (870).

Embodiment 4: SRS transmission power determination when the terminal does not have information about the reception beam of the base station.

Figure 7:
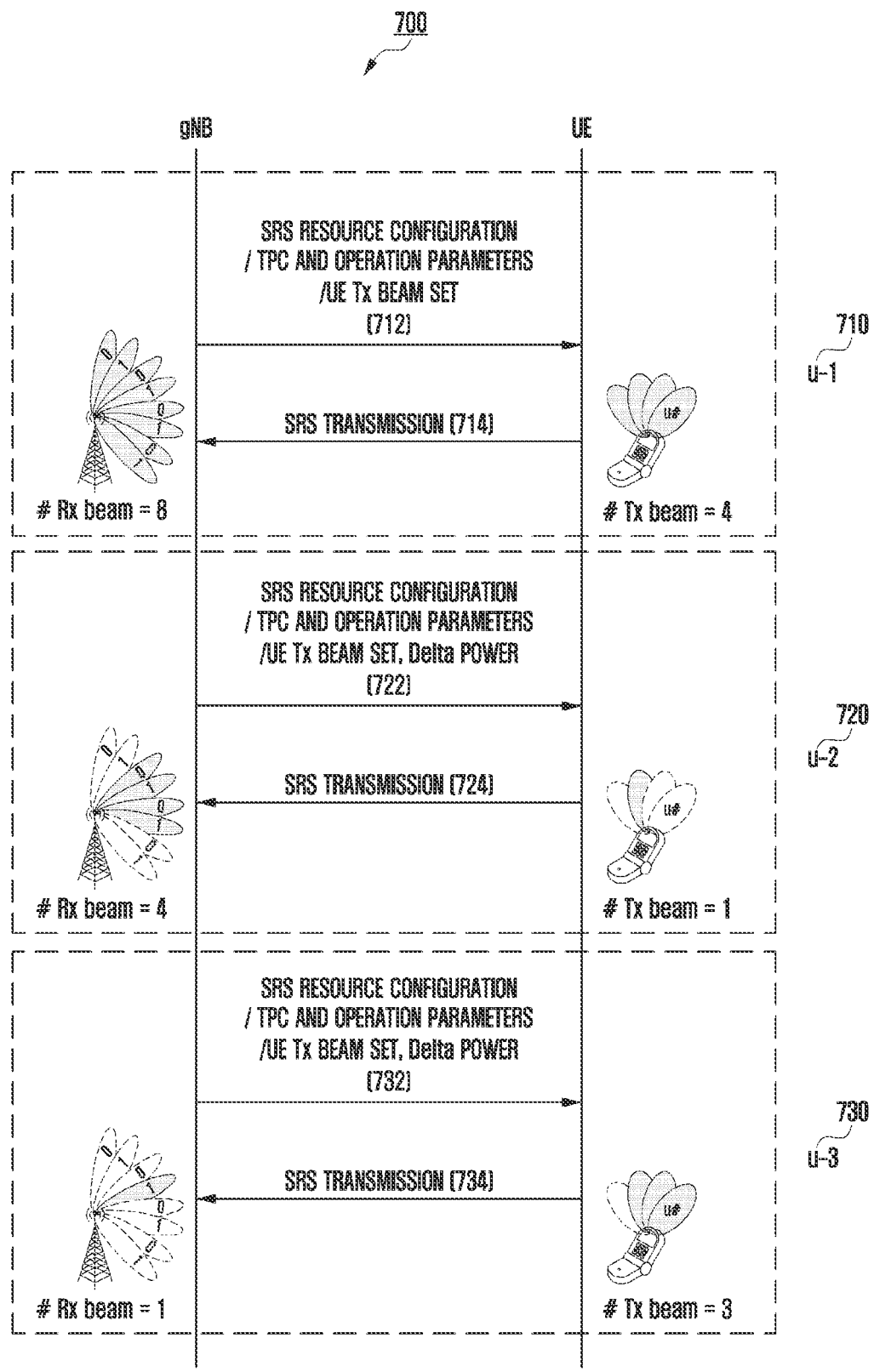
FIG. 7 illustrates a case where the terminal cannot know the reception beam of the base station during SRS transmission.

This embodiment is also applicable when the terminal does not know the reception beam of the base station operating uplink beams. FIG. 7 illustrates a case where the terminal cannot know the reception beam of the base station during SRS transmission. In the embodiment of FIG. 7, the terminal controls the transmission power of the terminal in stage U-2 (720) and stage U-3 (730) based on the power control information received in stage U-1 (710).

With reference to FIG. 7, in stage U-1 (710), the base station signals information about 4 transmission beam indexes={0,1,2,3} of the terminal to the terminal (712). The base station also transmits information necessary for calculating the SRS transmission power (request for the same transmission power, L3 filtered PL for the pathloss, and ΔPL=3 dB). In stage U-1 (710), the terminal may determine the SRS transmission power according to Equation 15 below, and the terminal may transmit the SRS by using the determined transmission power (714).

$$P_{SRS,k}(i1) = \min\begin{Bmatrix} P_{CMAX}(i), \\ 10\log_{10}(M_{SRS}(i)) + P_{0,srs}(j) + \\ \alpha_{SRS}(j) \cdot PL_{SRS,k}(t) + f_{SRS}(i) + \\ \Delta_{RX,BS} + \Delta_{TX,UE} \end{Bmatrix}[dBm] \quad \text{[Equation 15]}$$

$$PL_{SRS,k}(t) = L3 \text{ filtered } PL + 3, \text{ for all } k$$

In addition, even if the terminal does not obtain information on the transmission beam of the terminal from the base station in stage U-1 (710), the terminal may calculate the transmission power according to Equation 15.

In stage U-2 (720), the base station signals information about one transmission beam index=1 of the terminal to the terminal (722). The base station also transmits information necessary for calculating the SRS transmission power (request for the same transmission power, request for using the transmission power used in stage U-1 (710), and power difference (delta power) $\Delta P_{u2}$). In stage U-2 (720), the terminal may determine the SRS transmission power according to Equation 16 below, and the terminal may transmit the SRS by using the determined transmission power (724).

$$P_{SRS,k}(i2) = \min\begin{Bmatrix} P_{CMAX}(i2), \\ P_{SRS,k}(i1) + \Delta P_{u2} \end{Bmatrix}[dBm] \quad \text{[Equation 16]}$$

In stage U-3 (730), the base station signals information about 3 transmission beam indexes={1,2,3} of the terminal to the terminal (732). The base station also transmits information necessary for calculating the SRS transmission power (request for the same transmission power, request for using the transmission power used in stage U-1 (710) or stage U-1 (720), and power difference $\Delta P_{u3,1}$). In stage U-3 (730), the terminal may determine the SRS transmission power according to Equation 17 below, and the terminal may transmit the SRS by using the determined transmission power (734).

$$P_{SRS,k}(i3) = \quad \text{[Equation 17]}$$

$$\min\begin{Bmatrix} P_{CMAX}(i3), \\ P_{SRS,k}(i1) + \Delta P_{u3,l} \end{Bmatrix}[dBm] \text{ if requested for } u1 \text{ power}$$

$$P_{SRS,k}(i3) = \min\begin{Bmatrix} P_{CMAX}(i3), \\ P_{SRS,k}(i2) + \Delta P_{u3,l} \end{Bmatrix}[dBm] \text{ if requested for } u2 \text{ power}$$

The power difference $\Delta P_{u3,1}$ may be set to a different value for each transmission beam of the terminal.

Embodiment 5: SRS transmission power determination when simultaneously transmitting the SRS using multiple beams.

In this embodiment, when the base station performs uplink beam management for the terminal, the terminal simultaneously transmits the SRS using plural transmission beams.

Assuming that there are s transmission beams that can be transmitted simultaneously, the power required for simultaneous transmission with s beams may exceed the maximum power $P_{CMAX}(i)$ of the terminal. If the total sum of transmission powers at symbol k exceeds the maximum transmission power that can be used by the terminal (i.e., $\Sigma_S P_{SHS,k,s}(t) > P_{CMAX}(i)$), the weight $w_{k,s}$ may be adjusted to satisfy $$\Sigma_S w_{k,s} P_{SRS,k,s}(t) \leq P_{CMAX}(i).$$

The weight $w_{k,s}$ can be adjusted in various ways as in Equation 18 to Equation 20 below.

1) $w_{k,s} = \alpha \cdot P_{CMAX}(i)/\Sigma_S P_{SRS,k,s}(t)$ [Equation 18]

The terminal applies the same scale to all transmission power calculations, and a is greater than 0 and less than or equal to 1. This is applicable when the terminal does not know the reception beam of the base station.

2)

$$w_{k,s} = \begin{cases} 0 & , \text{ if } \widetilde{PL_{SRS,m}(t)} \geq PL_{th}(t) \\ a \cdot P_{CMAX}(i) / \sum_S P_{SRS,k,s}(t) & , \text{ if } \widetilde{PL_{SRS,m}(t)} < PL_{th}(t) \end{cases} \quad \text{[Equation 19]}$$

The terminal transmits the SRS only over a transmission beam that satisfies a specific criterion, and a is greater than 0 and less than or equal to 1.

3)

$$w_{k,s} = \begin{cases} b \cdot P_{CMAX}(i) / \sum_S P_{SRS,k,s}(t), & \text{if } \widetilde{PL_{SRS,m}(t)} \geq PL_{th}(t) \\ a \cdot P_{CMAX}(i) / \sum_S P_{SRS,k,s}(t), & \text{if } \widetilde{PL_{SRS,m}(t)} < PL_{th}(t) \end{cases} \quad \text{[Equation 20]}$$

The terminal scales the SRS transmission power with a different weight for each criterion, and a and b are greater than 0 and less than or equal to 1.

Here, $PL_{th}(t)$ may be specified variously, such as $L3 \text{filteredPL, min } \widehat{PL}_u + [x]db, \max \overline{PL} - [x]db.$ Embodiment 6: power determination when SRS and another uplink channel coexist.

When SRS transmission and an uplink channel such as PUSCH or PUCCH coexist at symbol k, the SRS transmission power is determined as follows.

Figure 9:
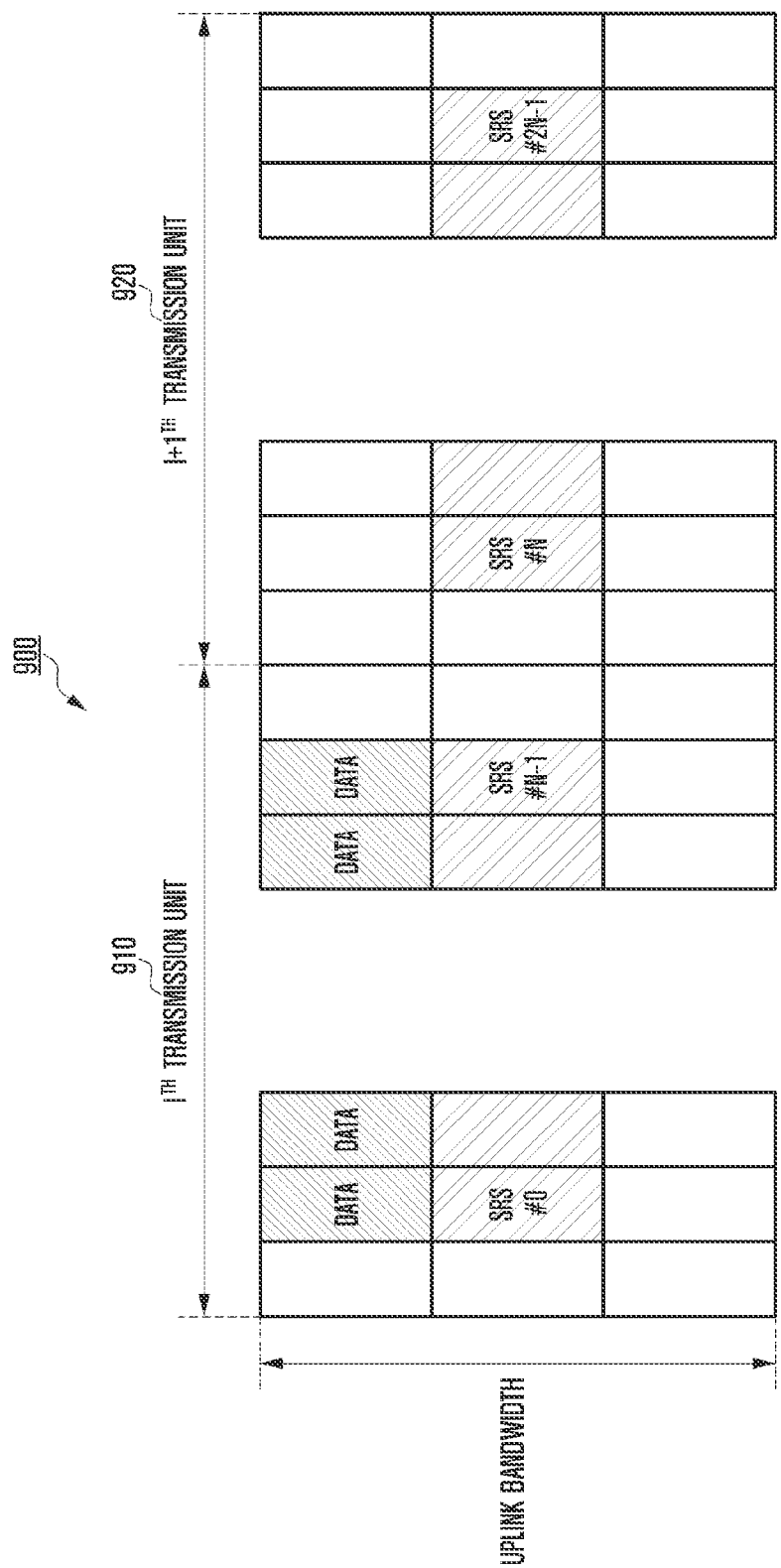
FIG. 9 depicts an example of coexistence between SRS and data channel.

6-1) As shown in FIG. 9, the terminal may simultaneously transmit a data channel and the SRS in the $i^{th}$ transmission unit 910, and transmit only the SRS in the $i+1^{th}$ transmission unit 920 (900).

① When the base station requires the same transmission power for all SRSs, the terminal may calculate the SRS transmission power according to Equation 21 below. It is assumed that L3 filtered PL is applied as a pathloss value for power calculation.

$$P_{SRS,k}(i) = \min\begin{Bmatrix} P_{CMAX}(i), \\ 10\log_{10}(M_{SRS}(i)) + P_{0,srs}(j) + \\ \alpha_{SRS}(j) \cdot PL_{SRS,k}(t) + f_{SRS}(i) + \\ \Delta_{RX,BS} + \Delta_{TX,UE} \end{Bmatrix}[dBm] \quad \text{[Equation 21]}$$

$$PL_{SRS,k}(t) = L3 \text{ filtered } PL + \Delta PL \text{ for all symbol}$$

In addition, the transmission power for data transmission can be calculated according to Equation 22 below.

$$P_{data,k}(i) = \min\begin{Bmatrix} P_{CMAX}(i), \\ 10\log_{10}(M_{data}(i)) + P_{0,data}(j) + \\ \alpha_{data}(j) \cdot PL_{data,k}(t) + f_{data}(i) + \\ \Delta_{RX,BS} + \Delta_{TX,UE} \end{Bmatrix}[dBm] \quad \text{[Equation 22]}$$

In this case, the total transmission power of the terminal is $P_{SRS,k}(i)+P_{data,k}(i)$ in the $i^{th}$ transmission unit 910, and is $P_{srs,k}(i+1)$ in the $i+1^{th}$ transmission unit 920.

If $P_{SRS,k}(i)+P_{data,k}(i)>P_{CMAX}(i)$ in the $i^{th}$ transmission unit 910, the power for each symbol is determined according to Equation 23 below. The weight is adjusted so that the transmission power per symbol is not greater than the total transmission power of the terminal.

$$w_{srs}P_{SRS,k}(i)+w_{data}P_{data,k}(i) \leq P_{CMAX}(i) \quad \text{[Equation 23]}$$

In the $i+1^{th}$ transmission unit 920, the SRS transmission power is determined by $P_{srs,k}(i+1)=w_{srs}P_{SRS,k}(i)$.

The above weight may be determined and signaled by the base station. That is, the power may be allocated to data transmission first and the remaining power may be allocated to SRS transmission, or vice versa.

② When the base station requires similar received powers for all SRSs, the terminal may calculate the SRS transmission power according to Equation 24 below.

$$P_{SRS,k}(i) = \min\left\{\begin{array}{c} P_{CMAX}(i), \\ 10\log_{10}(M_{SRS}(i))+P_{0,srs}(j)+ \\ \alpha_{SRS}(j)\cdot PL_{SRS,k}(t)+f_{SRS}(i)+ \\ \Delta_{RX,BS}+\Delta_{TX,UE} \end{array}\right\}[dBm] \quad \text{[Equation 24]}$$

$$PL_{SRS,k}(t) = PL_{SRS,k}(t) + \Delta PL \text{ for all symbol}$$

In addition, the transmission power for data transmission can be calculated according to Equation 25 below.

$$P_{data,k}(i) = \min\left\{\begin{array}{c} P_{CMAX}(i), \\ 10\log_{10}(M_{data}(i))+P_{0,data}(j)+ \\ \alpha_{data}(j)\cdot PL_{data,k}(t)+f_{data}(i)+ \\ \Delta_{RX,BSd}+\Delta_{TX,UE} \end{array}\right\}[dBm] \quad \text{[Equation 25]}$$

In this case, the total transmission power of the terminal is $P_{SRS,k}(i)+P_{data,k}(i)$ in the $i^{th}$ transmission unit 910, and is $P_{srs,k}(i+1)$ in the $i+1^{th}$ transmission unit 920.

If $P_{SRS,k}(i)+P_{data,k}(i)>P_{CMAX}(i)$ in the $i^{th}$ transmission unit 910, the power for each symbol is determined according to Equation 26 below. The weight is adjusted so that the transmission power per symbol is not greater than the total transmission power of the terminal.

$$w_{srs}P_{SRS,k}(i)+w_{data}P_{data,k}(i) \leq P_{CMAX}(i) \quad \text{[Equation 26]}$$

For $w_{srs}$, the same value $w_{srs}$=function $\{w_{srs,k}$ for all k$\}$ is applied in all base stations. It is selected from calculation weights for all SRS symbols.

In the $i+1^{th}$ transmission unit 920, the SRS transmission power is determined by $P_{srs,k}(i+1)=w_{srs,k}(i+1)$.

In addition, even in the same transmission unit, some symbols may simultaneously carry a data channel and an SRS, and the other symbols may carry only an SRS. In this case, the transmission power can be determined in the same way.

The above weights may be determined and signaled by the base station or may be a value agreed in advance between the base station and the terminal. That is, the power may be allocated to data transmission first and the remaining power may be allocated to SRS transmission, or vice versa. As another example, if data and control information are transmitted together in a multiplexed manner, the power may be allocated to the data first and the remaining power may be allocated to the SRS. However, if only data is transmitted without multiplexed control information, the transmission power may be allocated to the SRS first and the remaining power may be allocated to the data.

Figure 10:
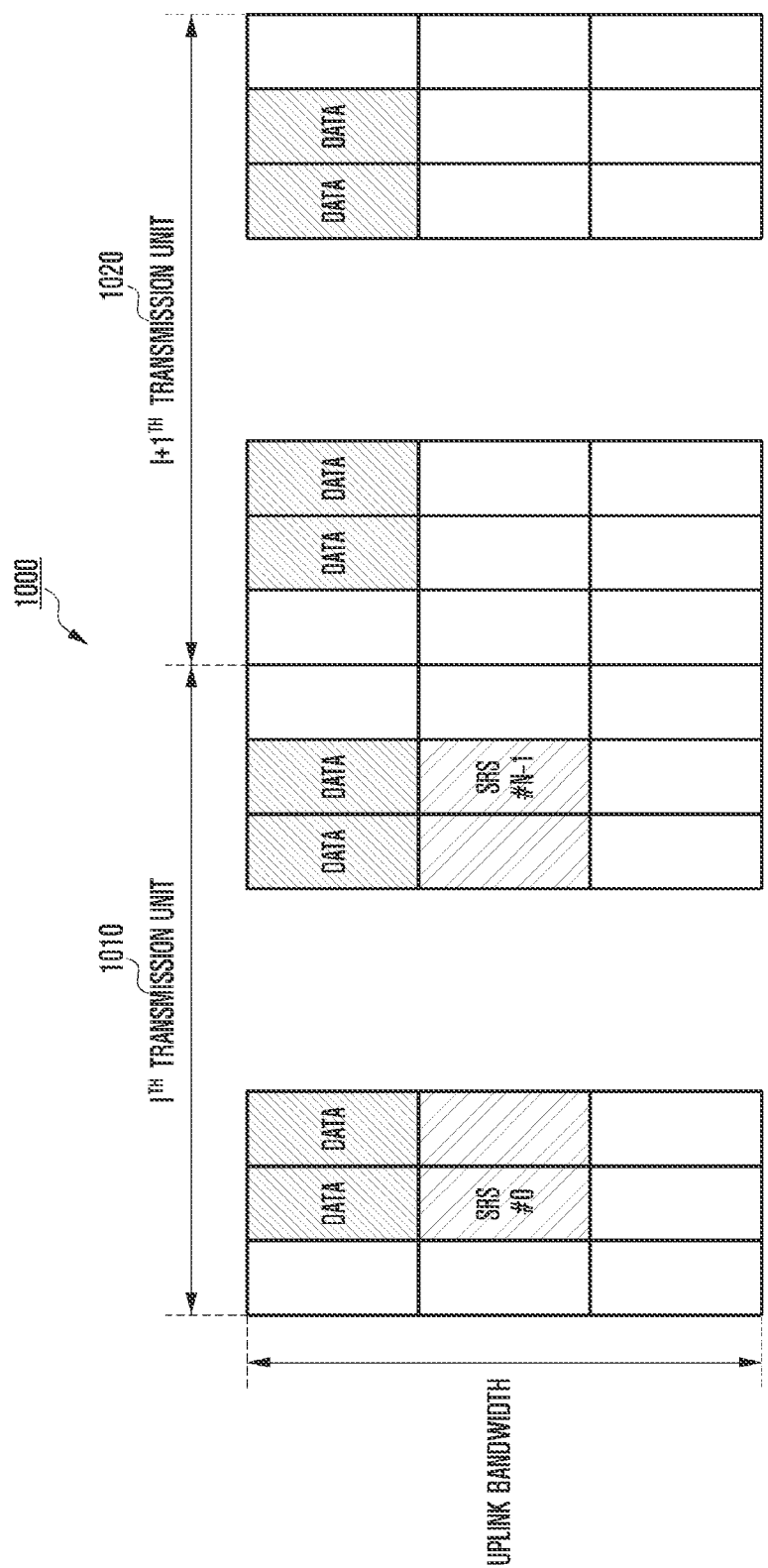
FIG. 10 depicts another example of coexistence between SRS and data channel.

6-2) By contrast, as shown in FIG. 10, the terminal may simultaneously transmit a data channel and the SRS in the $i^{th}$ transmission unit 1010, and transmit only a data channel in the $i+1^{th}$ transmission unit 1020 (1000).

① When the base station requires the same transmission power for all SRSs, the terminal may calculate the SRS transmission power according to Equation 27 below. It is assumed that L3 filtered PL is applied as a pathloss value.

$$P_{SRS,k}(i) = \min\left\{\begin{array}{c} P_{CMAX}(i), \\ 10\log_{10}(M_{SRS}(i))+P_{0,srs}(j)+ \\ \alpha_{SRS}(j)\cdot PL_{SRS,k}(t)+f_{SRS}(i)+ \\ \Delta_{RX,BS}+\Delta_{TX,UE} \end{array}\right\}[dBm] \quad \text{[Equation 27]}$$

$$PL_{SRS,k}(t) = L3 \text{ filtered } PL + \Delta PL \text{ for all symbol}$$

In addition, the transmission power for data transmission can be calculated according to Equation 28 below.

$$P_{data,k}(i) = \min\left\{\begin{array}{c} P_{CMAX}(i), \\ 10\log_{10}(M_{data}(i))+P_{0,data}(j)+ \\ \alpha_{data}(j)\cdot PL_{data,k}(t)+f_{data}(i)+ \\ \Delta_{RX,BSd}+\Delta_{TX,UE} \end{array}\right\}[dBm] \quad \text{[Equation 28]}$$

In this case, the total transmission power of the terminal is $P_{SRS,k}(i)+P_{data,k}(i)$ in the $i^{th}$ transmission unit 1010, and is $P_{data,k}(i+1)$ in the $i+1^{th}$ transmission unit 1020.

If $P_{SRS,k}(i)+P_{data,k}(i)>P_{CMAX}(i)$ in the $i^{th}$ transmission unit 1010, the power for each symbol is determined according to Equation 29 below. The weight is adjusted so that the transmission power per symbol is not greater than the total transmission power of the terminal.

$$w_{srs}P_{SRS,k}(i)+w_{data}P_{data,k}(i) \leq P_{CMAX}(i) \quad \text{[Equation 29]}$$

In the $i+1^{th}$ transmission unit 1020, the SRS transmission power is determined by $P_{data,k}(i+1)=w_{data}P_{data,k}(i)$.

The above weights may be determined and signaled by the base station or may be a value agreed in advance between the base station and the terminal. That is, the power may be allocated to data transmission first and the remaining power may be allocated to SRS transmission, or vice versa.

② When the base station requires similar received powers for all SRSs, the terminal may calculate the SRS transmission power according to Equation 30 below.

$$P_{SRS,k}(i) = \min\left\{\begin{array}{c} P_{CMAX}(i), \\ 10\log_{10}(M_{SRS}(i))+P_{0,srs}(j)+ \\ \alpha_{SRS}(j)\cdot PL_{SRS,k}(t)+f_{SRS}(i)+ \\ \Delta_{RX,BS}+\Delta_{TX,UE} \end{array}\right\}[dBm] \quad \text{[Equation 30]}$$

$$PL_{SRS,k}(t) = PL_{SRS,k}(t) + \Delta PL \text{ for all symbol}$$

In addition, the transmission power for data transmission can be calculated according to Equation 31 below.

$$P_{data,k}(i) = \min\left\{\begin{array}{c} P_{CMAX}(i), \\ 10\log_{10}(M_{data}(i))+P_{0,data}(j)+ \\ \alpha_{data}(j)\cdot PL_{data,k}(t)+f_{data}(i)+ \\ \Delta_{RX,BS}+\Delta_{TX,UE} \end{array}\right\}[dBm] \quad \text{[Equation 31]}$$

In this case, the total transmission power of the terminal is $P_{SRS,k}(i)+P_{data,k}(i)$ in the $i^{th}$ transmission unit 1010, and is Pw (i+1) in the i+1$^{th}$ transmission unit 1020.

If $P_{SRS,k}(i)+P_{data,k}(i)>P_{CMAX}(i)$ in the $i^{th}$ transmission unit 1010, the power for each symbol is determined according to Equation 32 below. The weight is adjusted so that the transmission power per symbol is not greater than the total transmission power of the terminal.

$$w_{srs}P_{SRS,k}(i)+w_{data}P_{data,k}(i) \leq P_{CMAX}(i) \quad \text{[Equation 32]}$$

In the i+1$^{th}$ transmission unit 1020, the SRS transmission power is determined by $p_{data,k}(i+1)=w_{data}P_{data,k}(i+1)$.

In addition, even in the same transmission unit, some symbols may simultaneously carry a data channel and an SRS, and the other symbols may carry only a data channel. In this case, the transmission power can be determined in the same way.

The above weights may be determined and signaled by the base station or may be a value agreed in advance between the base station and the terminal. That is, the power may be allocated to data transmission first and the remaining power may be allocated to SRS transmission, or vice versa. As another example, if data and control information are transmitted together in a multiplexed manner, the power may be allocated to the data first and the remaining power may be allocated to the SRS. However, if only data is transmitted without multiplexed control information, the transmission power may be allocated to the SRS first and the remaining power may be allocated to the data channel.

In the above embodiment, the parameters required for calculating the transmission power may be statically or dynamically transmitted through downlink control information (DCI), MAC control information (MAC CE), RRC, or the like.

For SRS transmission in the above embodiment, the base station may directly signal the transmission beam index or index set of the terminal. Or, even if the value is not directly transmitted, the terminal may obtain a transmission beam index for transmitting a corresponding resource from the resource allocation information such as an SRS resource index (SRI) or a CSI-RS resource index (CRI).

To calculate the pathloss for the power control, it is possible to use the following downlink reference signals such as synchronization signal (SSS), physical broadcast channel (PBCH), periodic channel state indication-reference signal (CSI-RS), and aperiodic CSI-RS. These channels may be transmitted periodically or aperiodically.

Hence, the base station needs to specify a reference signal to be used by the terminal to calculate the pathloss necessary for power control. As one option, the base station may signal the reference signal, among the SSS, BPCH, periodic CSI-RS, and aperiodic CSI-RS, which is used by the terminal to calculate the pathloss to be reflected in power control calculation. Alternatively, the base station and the terminal may determine the priority among the reference signals to calculate the pathloss. For example, if the priority for calculating the pathloss among three reference signals of SSS, PBCH, and periodic CSI-RS is given by periodic CSI-RS, SSS, and PBCH in order, the terminal may use the periodic CSI-RS as the reference signal for calculating the pathloss. Here, if only the SSS is present, the SSS may be used as the reference signal for pathloss calculation.

As another option, the base station may signal the reference signal to be used for each uplink channel. For example, the base station may signal that the PUSCH uses a pathloss value calculated based on the CSI-RS and the SRS uses a pathloss value calculated based on the SSS. As another option, the reference signal to be used for pathloss calculation may be defined for each uplink channel and the priority among the reference signals may be determined in addition.

In addition, the terminal performs a filtering operation to obtain the pathloss values necessary for power control. Layer 1 (L1) filtering and layer 3 (L3) filtering are possible for the filtering operation. L1 filtering is an operation performed for each beam combination (beam pair link (BPL)), and L3 filtering includes filtering pathloss values calculated in layer 1 (L1) for each beam combination and computing an average for a beam combination that satisfies a specific criterion. That is, there are plural pathloss values that the terminal can calculate, such as L1 pathloss for each BPL (or, transmission beam and reception beam), L3 pathloss for each BPL (or, transmission beam and reception beam), and average L3 pathloss. Various transmission power methods exist for each uplink channel, and the base station may perform higher-layer signaling so that the filtered pathloss values may be used depending on the situation according to beam operation of the terminal and the base station. Alternatively, different filtering options set in advance may be used for different uplink channels. For example, it is possible to signal that the PUSCH uses a L1-filtered pathloss value and the SRS uses a L3-filtered pathloss value, and so on.

Figure 11:
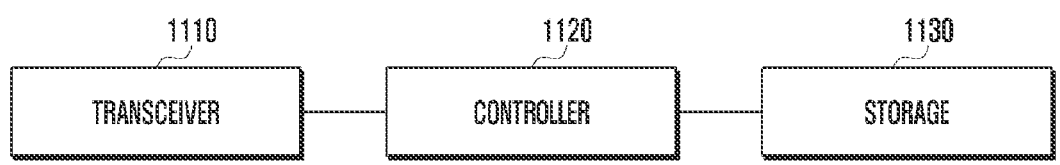
FIG. 11 is a block diagram of a terminal according to an embodiment of the disclosure.

FIG. 11 is a block diagram of a terminal according to an embodiment of the disclosure.

With reference to FIG. 11, the terminal may include a transceiver 1110, a controller 1120, and a storage 1130. In the disclosure, the controller may be referred to as a circuit, an application specific integrated circuit, or at least one processor.

The transceiver 1110 may transmit and receive a signal to and from another network entity. The transceiver 1110 may receive, for example, system information, a synchronization signal, or a reference signal from the base station.

The controller 1120 may control the overall operation of the terminal according to the embodiments proposed by the disclosure. For example, the controller 1120 may control the signal flow between blocks to perform operations according to the flowchart described above. In one embodiment, the controller 1120 may control the uplink power of the terminal according to a change of the beam in the beamforming system.

The storage 1130 may store at least one of information transmitted and received through the transceiver 1110 or information generated by the controller 1120.

Figure 12:
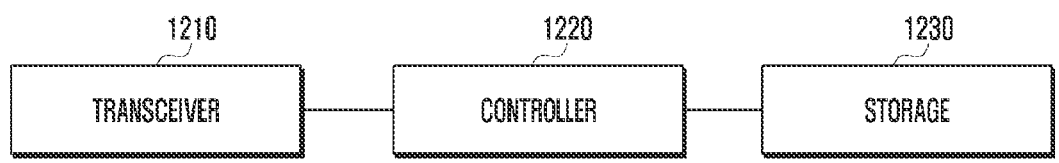
FIG. 12 is a block diagram of a base station according to an embodiment of the disclosure.

FIG. 12 is a block diagram of a base station according to an embodiment of the disclosure.

With reference to FIG. 12, the base station may include a transceiver 1210, a controller 1220, and a storage 1230. In the disclosure, the controller may be referred to as a circuit, an application specific integrated circuit, or at least one processor.

The transceiver 1210 may transmit and receive a signal to and from another network entity. The transceiver 1210 may transmit, for example, system information, a synchronization signal, or a reference signal to the terminal.

The controller 1220 may control the overall operation of the base station according to the embodiments proposed by the disclosure. For example, the controller 1220 may control the signal flow between blocks to perform operations according to the flowchart described above. In one embodiment, the controller 1220 may control the uplink power of the terminal according to a change of the beam in the beamforming system.

The storage 1230 may store at least one of information transmitted and received through the transceiver 1210 or information generated by the controller 1220.

Hereinabove, embodiments of the disclosure have been described with reference to the accompanying drawings. Specific terms or words used in the description should be construed in accordance with the spirit of the disclosure without limiting the subject matter thereof. It should be understood that many variations and modifications of the basic inventive concept described herein will still fall within the spirit and scope of the disclosure as defined in the appended claims and their equivalents.

The above embodiments may be carried out in combination if necessary.

What is claimed is:

1. A method performed by a terminal in a wireless communication system, the method comprising:
   identifying that a sum of a first transmission power for an uplink data in a slot and a second transmission power for a sounding reference signal (SRS) in the slot exceeds a maximum transmission power;
   transmitting, to a base station in the slot, the uplink data by allocating transmission power to the uplink data with a higher priority; and
   transmitting, to the base station in the slot, the SRS by allocating remaining power to the SRS, so that a total transmission power for the uplink data and the SRS is smaller than or equal to the maximum transmission power.

2. The method of claim 1, wherein the uplink data is transmitted on a first uplink carrier, and the SRS is transmitted on a second uplink carrier.

3. The method of claim 1, wherein the uplink data and the SRS are frequency division multiplexed in the slot.

4. The method of claim 1, wherein the total transmission power is identified for a symbol of the slot.

5. The method of claim 1, wherein the first transmission power and the second transmission power are adjusted by applying weight values which are received from the base station.

6. A method performed by a base station in a wireless communication system, the method comprising:
   receiving, from a terminal in a slot, an uplink data; and
   receiving, from the terminal in the slot, a sounding reference signal (SRS),
   wherein, in case that a sum of a first transmission power for the uplink data and a second transmission power for the SRS exceeds a maximum transmission power, transmission power is allocated to the uplink data with a higher priority and remaining power is allocated to the SRS, and
   wherein a total transmission power for the uplink data and the SRS is smaller than or equal to the maximum transmission power.

7. The method of claim 6, wherein the uplink data is received on a first uplink carrier, and the SRS is received on a second uplink carrier.

8. The method of claim 6, wherein the uplink data and the SRS are frequency division multiplexed in the slot.

9. The method of claim 6, wherein the total transmission power is identified for a symbol of the slot.

10. The method of claim 6, wherein the first transmission power and the second transmission power are adjusted by applying weight values which are transmitted to the terminal.

11. A terminal in a wireless communication system, the terminal comprising:
    a transceiver configured to transmit or receive a signal; and
    a controller configured to:
       identify that a sum of a first transmission power for an uplink data in a slot and a second transmission power for a sounding reference signal (SRS) in the slot exceeds a maximum transmission power,
       transmit, to a base station in the slot, the uplink data by allocating transmission power to the uplink data with a higher priority, and
       transmit, to the base station in the slot, the SRS by allocating remaining power to the SRS, so that a total transmission power for the uplink data and the SRS is smaller than or equal to the maximum transmission power.

12. The terminal of claim 11, wherein the uplink data is transmitted on a first uplink carrier, and the SRS is transmitted on a second uplink carrier.

13. The terminal of claim 11, wherein the uplink data and the SRS are frequency division multiplexed in the slot.

14. The terminal of claim 11, wherein the total transmission power is identified for a symbol of the slot.

15. The terminal of claim 11, wherein the first transmission power and the second transmission power are adjusted by applying weight values which are received from the base station.

16. A base station in a wireless communication system, the base station comprising:
    a transceiver configured to transmit or receive a signal; and
    a controller configured to:
       receive, from a terminal in a slot, an uplink data, and receive, from the terminal in the slot, a sounding reference signal (SRS),
    wherein, in case that a sum of a first transmission power for the uplink data and a second transmission power for the SRS exceeds a maximum transmission power, transmission power is allocated to the uplink data with a higher priority and remaining power is allocated to the SRS, and
    wherein a total transmission power for the uplink data and the SRS is smaller than or equal to the maximum transmission power.

17. The base station of claim 16, wherein the uplink data is received on a first uplink carrier, and the SRS is received on a second uplink carrier.

18. The base station of claim 16, wherein the uplink data and the SRS are frequency division multiplexed in the slot.

19. The base station of claim 16, wherein the total transmission power is identified for a symbol of the slot.

20. The base station of claim 16, wherein the first transmission power and the second transmission power are adjusted by applying weight values which are transmitted to the terminal.

* * * * *